INVENTOR.
GLENN L. RICHARDS
BY [signature]
ATTORNEY

Aug. 8, 1961 G. L. RICHARDS 2,995,734

DATA STORAGE SYSTEM

Filed March 2, 1959 4 Sheets-Sheet 2

Aug. 8, 1961 G. L. RICHARDS 2,995,734

DATA STORAGE SYSTEM

Filed March 2, 1959 4 Sheets-Sheet 4

United States Patent Office 2,995,734
Patented Aug. 8, 1961

2,995,734
DATA STORAGE SYSTEM

Glenn L. Richards, Rochester, N.Y., assignor to General Dynamics Corporation, Rochester, N.Y., a corporation of Delaware Filed Mar. 2, 1959, Ser. No. 796,537
39 Claims. (Cl. 340—174)

My invention relates to registers suitable for use in a data storage system and more particularly to the so-called shift type registers.

A shift register may have several stages. Each stage includes a storing unit, the storing units of the various stages being arranged serially in head-to-tail relationship. Such a register also includes means for passing data, which may be in the form of binary information bits, which are sequentially applied to the first stage input through each of the stages and subsequently applying the information bit signals to a load when the signals appear on the output of the last storing unit. Such registers find applications in systems wherein delayed signal transmission or delayed signal transmission and translation is required. It has been observed that bistable devices, such as ferrite cores, are especially useful as information bit signal storing media within the various storing units of such registers owing to the relatively high signal output to input ratio and the passive nature of ferrite core devices.

In such registers, it has been the practice to provide a so-called logic system external to the storing units for steering signals from a common clock, which are used for read signals by the cores within the various storing units, into the various storing units in order to control the shifting of data from one register stage to the next. Since the logic system is common to a number of interrelated stages, it is necessarily complex and therefore expensive to build. Further, its complexity makes both it and the shift register controlled thereby relatively inflexible in that stages may not be added to or removed from the system without making extensive changes within the logic system.

Therefore, it is an object of my invention to provide a new and improved shift register.

Another object of my invention is to provide a new and improved shift register having a logic system individual to each of the various storing units within the register.

Another object of my invention is to provide a new and improved logic system for steering read signals into storing units of the various stages of a shift register.

Another object of my invention is to provide a new and improved logic system of extreme simplicity for use in conjunction with an individual storing unit of a shift register.

Another object of my invention is to provide a new and improved logic system for a storing unit of an individual shift register stage which does not depend for its operation on apparatus other than substantially identical logic systems individual to the next adjacent stages of a shift register.

I accomplish these and other objects in a shift register having a plurality of substantially identical storing units individual to stages which are arranged in a series. Each storing unit includes at least one binary memory device, such as a ferrite core having two or more windings thereon, for receiving and storing signals.

In the remainder of the present specification, it is assumed, for the purpose of maintaining simplicity in description only, that this and other ferrite cores yet to be described are arranged to be shifted from one bistable state to the other only in response to signals which are negative-going with respect to a common ground, and further that the various signals produced by such ferrite cores which are to be utilized within the equipment companion to such cores are negative with respect to ground unless otherwise specifically called out. It is also pointed out that where change of condition of a core is effective for producing a positive signal on the core's output winding, the succeeding equipment generally is arranged to reject such signals. Therefore, the generation of such positive signals is ignored in the following description except where their function is necessary to the operation of the equipment.

Returning to the consideration of the register, the memory ferrite core in each storing unit has input, output, read and sensing windings. Interstage switching devices are provided for gating a signal source output to the first storing unit memory core input winding, the output windings of the memory core within the first and each intermediate storing unit to the memory core input winding of the next succeeding stage storing unit, and the output winding of the last stage storing unit core to a load. Following the operation of the memory core within any storing unit to its second stable state (which is hereinafter arbitrarily designated "1") by the application of a signal from the preceding stage representing an information bit to its input winding, the memory core under consideration thereafter is to be driven to its first stable state (hereinafter designated "0") in response to the subsequent application of a signal to its read winding and, consequently, to produce signals on each of the output and sensing windings.

In order to provide signals for the read windings of the various storing units, I provide a clock common to all stages of the register. The clock has first and second output conductors and is operative for producing signals on each conductor which are equally spaced apart in time and which occur alternately on the first and second conductors. The impulses occurring on these first and second output conductors are hereinafter referred to as "A clock impulses" and "B clock impulses," respectively. The A clock impulses are applied to the read windings of the core memory device within the various storing stages in the manner next described.

It is necessary to steer A clock signals to the read windings of the memory cores within the various storage stages in order to control the flow of data through the register. Accordingly, I provide a plurality of logic or steering circuits, each circuit being individual to the storing unit within one of the stages. Each logic circuit includes first and second bistable memory elements, such as ferrite cores. Each element has signal and reset inputs and an output and is operable in response to signals applied to its signal and reset inputs to "0" and "1" stable conditions, respectively. Each element is further effective in response to its operation from "1" to "0" condition for producing a signal on the element output, so that signals applied to the signal input of either element when the latter is in "1" condition can be considered to be "passed" to the output, and each element can be regarded as an "and" gate which passes a signal applied to the signal input to the output when the core previously has been driven to its "1" condition.

Means including the signal input and output of the first bistable element in each logic circuit is used for coupling the clock first output conductor to the read winding of the memory core within the corresponding one of the storage stages. The first bistable element, functioning as a gate, is effective for passing the next occurring A impulse to the corresponding storage stage core if the first bistable element is in the "1" condition at the time the clock impulse is applied. The last-named means is also provided for coupling A impulse clock output to the reset input of the second bistable element thereby assuring that the second bistable element is driven to its "1" condition each time a read impulse is sent to the storing circuit. It is now assumed that the occurrence of the impulse on the clock first output conductor finds the first bistable element of the logic circuit within a stage selected for individual consideration in "1" condition, and that a pulse is sent to the corresponding storing stage core read winding and to the reset input of the second bistable element of the same logic circuit.

Each logic circuit further includes unidirectional coupling means, such as an "or" gate, having first and second signal inputs and an output. The "or" gate may be a ferrite core capable, in its "1" condition, of passing signals applied to either input to its output. Means including the series-connected signal input and output of the second bistable element and the first input and output of the "or" gate is used for connecting the clock second output conductor to the reset input of the corresponding first bistable element. The application of each B impulse on the clock second output conductor assures that the second bistable element is placed in "0" condition and further, if the second bistable element has been in "1" condition, the resulting change of condition from "1" to "0" of the second bistable element core passes the B impulse to the reset input of the first bistable element, resetting the latter to the "1" condition. In order to reset the ferrite core "or" gate, that gate is furnished with an additional reset input which is connected to the first clock output. The "or" gate core is restored to its "0" condition by the application of A impulses to its reset input, so that the "or" gate is prepared to pass any B impulse applied to either of its signal inputs.

With the above-described arrangement, it is seen that in the absence of external signals (supplied by apparatus yet to be described), the first and second elements of the logic circuit within any stage are maintained in opposite conditions and alternated between their "0" and "1" conditions by the clock impulses, and the first element is effective for delivering A impulses to the read winding of the memory core within the corresponding one of the storage stages, whether or not an information bit signal is present in that storing unit and awaiting transfer to the next succeeding storage stage.

It is next assumed that an information bit signal has been applied to the input winding of the storing unit within the register stage being connected here, so that with the above-described arrangement of equipment, the next occurring A clock impulse passed to the read winding of the storing unit core will cause a signal to be generated on that storing core's output winding. From the above description, it is obvious that apparatus must be provided for preventing the first bistable means from passing the next A impulse to the storing unit if a signal already is stored within the next succeeding register stage and is not to be moved from that succeeding stage upon the next occurrence of an A clock impulse. Accordingly, each control unit further includes inhibiting means individual to its second bistable element. The inhibiting means is effective in response to the application of a signal thereto for blocking the passage of the next occurring B clock impulse through the second bistable element. The inhibiting means is connected to the sensing winding of the storage core or cores within the next preceding register stage, so that the inhibiting means is made effective to block reset input signals directed toward the first bistable means only when a signal is being passed from that preceding unit through the interstage coupling means toward the storage unit within the stage being considered here.

At this point in the operation of the logic circuit within the storing stage under consideration, the decision of whether or not the control unit is to send an A clock pulse to the read winding of the memory core storing stage is dependent on whether or not a signal stored within the next succeeding storing stage is to be moved out upon the occurrence of the next succeeding A clock impulse. Since the logic circuits within the register are substantially identical to each other, examination of the above-described logic circuit shows that the readiness of any stage to accept an information bit signal upon the occurrence of the next succeeding A impulse is indicated by the passage of the B clock pulse through the first input and output of the "or" gate within the logic circuit of that stage. Accordingly, means is provided for coupling the first input of the "or" gate within the logic circuit of the next succeeding register stage to the aforementioned second input of the "or" gate within the register stage being considered here. With this arrangement, the second bistable element of the next succeeding storing stage provides an alternate path for passing B clock impulses to the reset input of the first bistable element of the logic circuit within the register stage under consideration, so that the read impulse is transmitted from any logic circuit to its corresponding storing unit only when it is apparent that the resulting signal on the output winding of the magnetic core memory element within that storing unit is not about to be added to a signal already stored within the next succeeding stage.

For the convenience of the reader, reference is made in the following description of the system forming the preferred embodiment of my invention, to drawings attached to and forming a part of the present specification and in which:

FIG. 1 shows a schematic diagram of an impulsing circuit and a block diagram of a signal storage unit;

FIG. 6 shows the order in which FIGS. 1–3 are to be arranged.

Figures 1, 6:
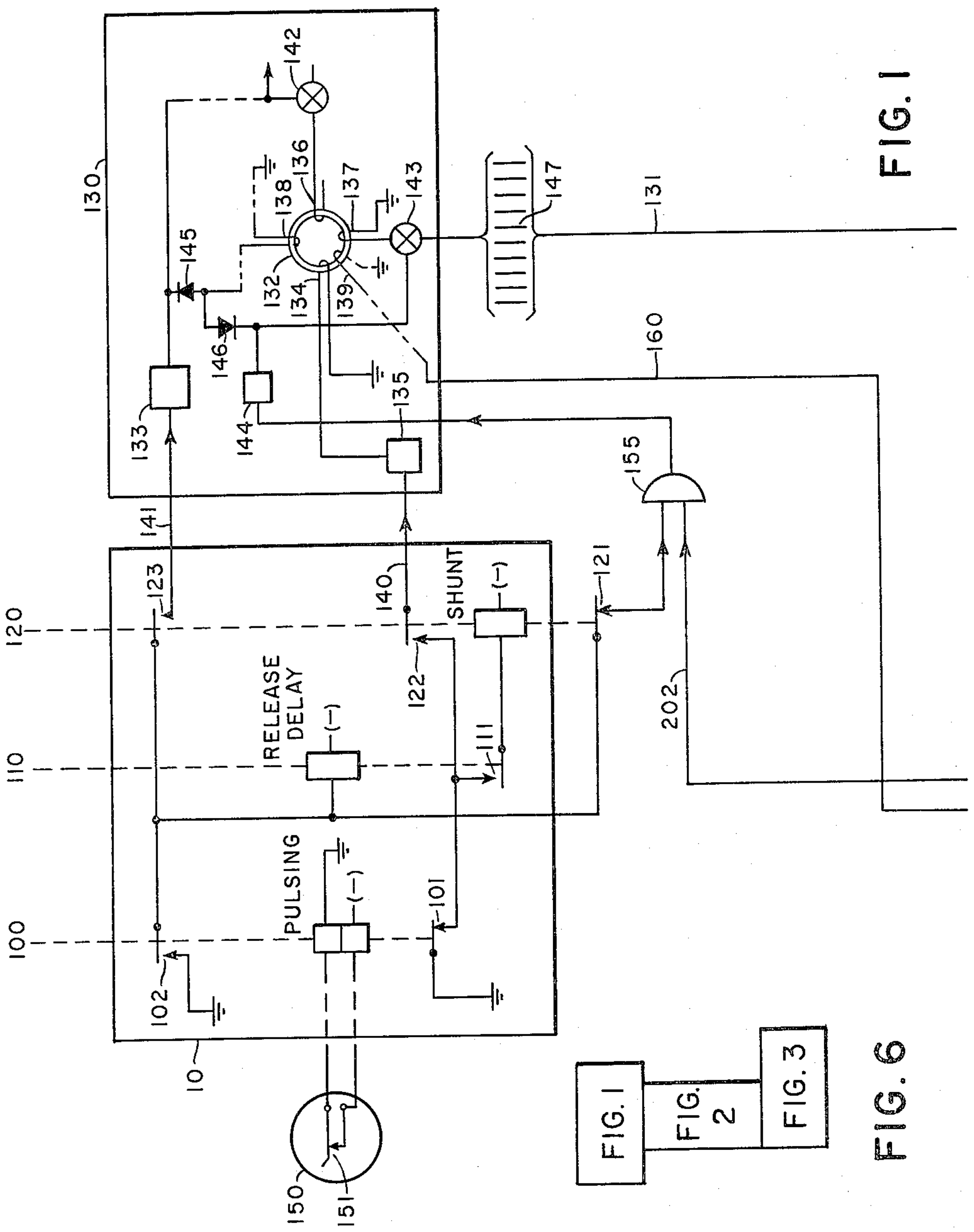

In the following description, power is supplied from a source of direct current, such as a battery having its most positive terminal connected to the aforementioned ground, which is indicated by the conventional symbol in the drawing and is hereinafter referred to as "ground." Similarly, the most negative, ungrounded terminal of the battery is represented in the drawings by the symbol (−) and is hereinafter referred to as "battery."

*General description*

Figure 2:
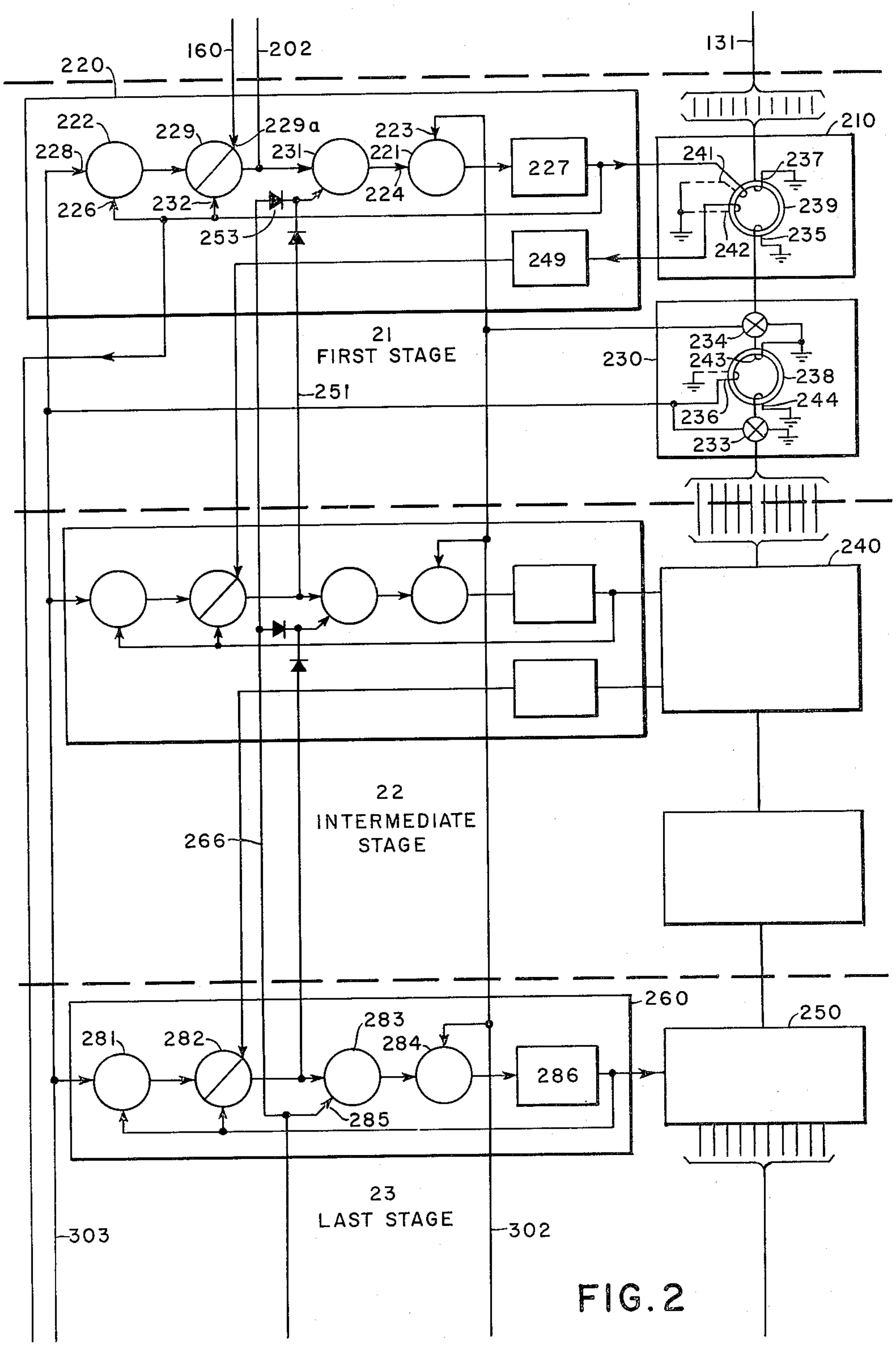
FIGS. 2 and 3 show a logic diagram of a shift register.
Figure 3:
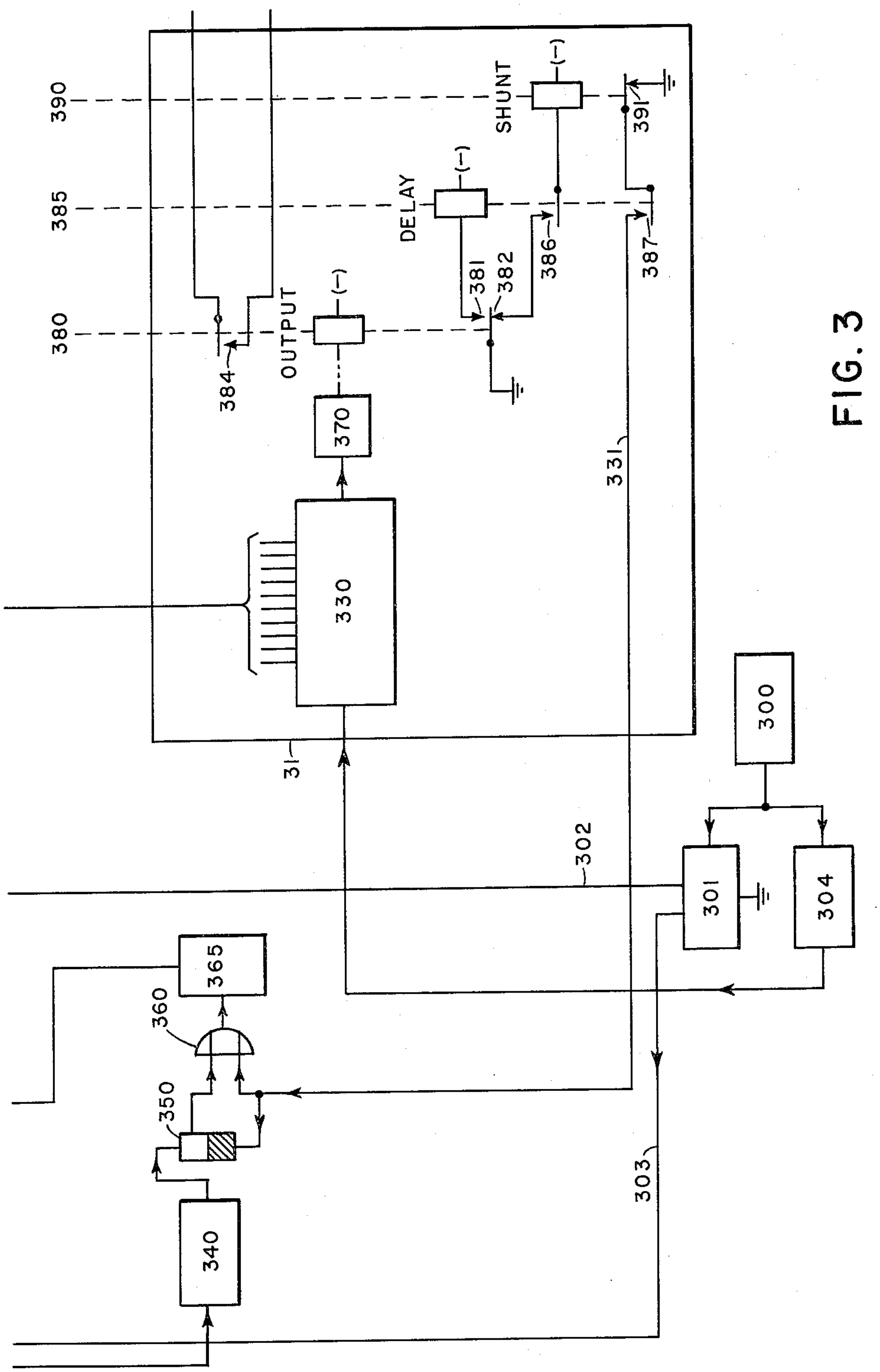

Referring to FIGS. 1–3, I provide a signal source, such as dial 150, for generating trains of up to ten consecutive digital impulses. These impulses are applied to relay means within termination 10 which is operative for repeating and applying the impulse trains from dial 150 to the input of counter 130. At the end of the insertion of each train of impulses into counter 130, means within counter 130 is prepared to energize one of the output conductors collectively indicated as 131, and upon receipt of an enabling clock signal over conductor 202, other means within counter 130 is operative for energizing the prepared ones of output conductors 131. In this manner, each successive incoming train of digit signals is converted into binary information bits or signals which appear on the selected one of output conductors 131. At the same time, means operative in response to the operation of the output conductor energizing means is effective for producing a signal on conductor 160.

It is the purpose of the shift register shown in FIGS. 2 and 3 to receive binary signals from counter 130 and to retransmit such signals in the manner described below. In the remainder of this description, it is assumed that the FIGS. 2 and 3 shift register, and the equipment succeeding the register, is capable of accepting information signals from counter 130 faster than counter 130 can produce such signals, so that means for stopping the operation of counter 130 from the shift register is not provided.

The shift register of FIGS. 2 and 3 includes a number of stages, such as 21, 22 and 23, which are arranged in a series. All stages of the FIGS. 2 and 3 shift register are substantially identical to each other. Therefore, the explanation of the register here, and in the detailed description which follows, is confined so far as possible to a description drawn in terms of first stage 21 in order to avoid needless repetition.

Each stage includes so-called permanent and temporary storing units, such as 210 and 230, respectively, in the case of stage 21. Each permanent and temporary storing unit has a plurality of bistable cores, such as 239 and 238, respectively. Each core in each storing unit corresponds to a particular one of conductors 131 and is operative for storing and retransmitting binary signals transmitted to it from corresponding cores in the next preceding storing unit and next succeeding storing unit, respectively. For the remainder of this description, counter 130, in addition to functioning as a source of binary signals, is also regarded as being equivalent in function to a storing stage which precedes stage 21.

Output conductors 131 of counter 130 are connected through switching devices such as 143 to the inputs of cores within permanent storing unit 210 of first stage 21. The outputs of the cores within permanent storing unit 210 are connected to the inputs of corresponding cores included in temporary storing unit 230 within stage 21. In the case of last stage 23, permanent storing unit 250 has output conductors connected directly to the input of register 330 which may be regarded as part of the load to which signals from dial 150 are to be applied.

In order to supply read signals to the magnetic cores within the permanent and temporary storing units of all stages and the logic circuits (yet to be described) individual to those units, clock 301 is furnished for providing impulses alternately on conductors 302 and 303. The impulses on each of conductors 302 and 303 are equally spaced apart in time from each other. For purposes of convenience, the impulses appearing on conductors 302 and 303 are hereinafter referred to as "A impulses" and "B impulses," respectively.

Returning to the consideration of counter 130, after a complete train of digital impulses has been registered within counter 130, the next occurring B impulse is passed through first logic circuit 220 and enables gate 155 to pass a signal to counter 130. The latter signal causes counter 130 to read out a signal stored therein on a particular one of conductors 131.

At the same time, the B impulse is effective for closing the switching means 233 in order to pass signals previously transmitted through core 239 from the selected one of conductors 131 into a core, such as 238 within temporary storing unit 230. This same B impulse also is applied to the read input of each core such as 238 within temporary storing unit 230 in order to transfer signals stored therein to the permanent storing unit in the next succeeding stage 22. Thus it is to be seen that any signals passed to the temporary storing unit of any register stage including counter 130 is passed to the permanent storing unit of the next succeeding stage upon the occurrence of the next B impulse.

In order to control the flow of signals from each permanent storing unit within each stage to its succeeding temporary unit and thereby control the advance of stored binary signals from one stage to the next within the shift register, a logic circuit, such as 220, individual to each temporary and permanent storage unit is provided for steering A impulses to the read winding of the magnetic cores within the corresponding permanent storing units. Thus, in the case of stage 21, logic circuit 220 is individual thereto. Logic circuit 220 includes first and second bistable "and" gates 221 and 222, respectively. Gate 221 is normally in its "1" condition at this time and effective for passing each A impulse to the read inputs of memory cores, such as 239, within storing unit 210 and also to the reset input of gate 222, so that gate 222 is placed in its "1" condition.

The signal input of gate 222 is connected to conductor 303. Gate 222, reset to its "1" condition, is effective for passing pulses applied to its signal input. B impulses passed through gate 222 are applied through inhibiting gate 229 and "or" gate 231 to the reset input of gate 221. Gate 221 is reset to its "1" condition by the nast-named impulse and therefore is made effective to pass the next occurring A impulse to its permanent storing unit 210. In this manner, A pulses continue to be applied to permanent storing unit 210 at least until a signal is passed to that storing unit from counter 130.

When counter 130 (now considered as the stage next preceding stage 21) reads out a signal to permanent storing unit 210, the aforementioned signal transmitted over conductor 160 makes inhibiting gate 224 of control unit 220 effective for blocking the passage of the coincident B impulse to the reset input of gate 221. Consequently, gate 221 is not reset from this source at this time. From the above considerations, it is obvious that gate 221 must be reset and thereby made operative if that gate is to pass the next occurring A impulse to the read input of storing unit 210 and therewith cause permanent storing unit 210 to read out any stored signal to temporary storing unit 230 for retransmission into permanent storing unit 240 of the next succeeding stage.

Assuming that stage 220 is in condition to receive input signals at its permanent storing unit, it follows that it must have transmitted the last read (A impulse) to its permanent storing unit and reset its second gate (i.e., the one corresponding to gate 222) so that the B impulse, which has been blocked at gate 222, is passed by the second gate and the inhibiting gate within stage 22. Accordingly, the output of the inhibiting gate within stage 22 is connected to the second input of "or" gate 231, so that the reset input of first gate 221 receives its reset impulse from this alternate path through stage 22.

On the other hand, if stage 22 is not in condition to receive information in its permanent storing unit 240 upon the occurrence of the next A impulse because it and the stages succeeding 22 are currently storing signals and last stage 23 is not in condition to read out the signal stored therein to register 330, the inhibiting gate corresponding to 229 within stage 22 blocks the passage of the B impulse both to its own first gate and to the reset input of gate 221 within stage 21. In this manner, signals may be held in any stage until the succeeding stage has been cleared to receive such signals.

Having described how information signals are passed from one register stage to the next, I next turn to the consideration of how such signals are spilled to the load including register 330. Since the FIGS. 2 and 3 shift register in the preferred embodiment of my invention is not arranged to spill digital signals from the last stage into register 330 upon the arrival of such signals at last stage 23, but rather to wait until all stages of the register are full before spilling, means is provided for detecting the fact that all register stages are full. From the above considerations, it is to be seen that first stage 21 continues to pass A impulses through gate 221 until all succeeding stages including 22 are holding signals in their permanent storing units, a condition evidenced when an inhibit signal is received from counter 130 and the passage of B impulses is blocked through the gate within next stage 22 which corresponds to gate 222.

Accordingly, the output of gate 221 is applied to signal inverter 340. Inverter 340 is effective for withholding signals from its output so long as successive A impulses received from stage 21 are present on the inverter 340 input. Inverter 340 is operative upon missing a single A impulse for producing a signal on its output which is applied to the upper input of flip flop 350. The resulting signal on the output of flip flop 350 is passed through "or" gate 360 to the input of trigger signal generator 365. Generator 365 is operative upon the receipt of a signal on its input for producing a single signal on its output which is applied to the second input of the last stage "or" gate corresponding to gate 231 and to similar "or" gates in all other stages over conductor 266. Signals applied over conductor 266 serve as a reset impulse to gate 221 within stage 21 and all the gates corresponding to "and" gate 221 in all other stages of the shift register including the last.

Upon the receipt of a signal over conductor 266, the gate 221 in first stage 21 and the corresponding gate in each intermediate stage and the last stage of the register are enabled to pass the next occurring A impulse, so that signals stored in the permanent storing units of all stages are read out to their temporary storing units, and subsequently to the next succeeding stage. In the case of the last stage, permanent storing unit 250 spills the signal stored therein to register 330. Driving impulses for register 330 are provided by clock 304, which in turn is driven from the output of oscillator 300. Read impulses from clock 303, which are produced at a submultiple rate of impulses from oscillator 300, are applied for shifting information stored in register 330 into delay multivibrator 370. The output of multivibrator 370 is applied to relay means within termination 31. This relay means is effective for repeating impulses from multivibrator 370 to an external circuit (not shown). The relay means within termination 31 also is effective at the conclusion of each train of impulses for applying an impulse over conductor 331 to the lower, reset input of flip flop 350 and to the input of trigger 365 through the second, lower input of "or" gate 360. The additional trigger signals continue to be generated by generator 365 until the last digital information stored in the shift register has been applied to the input of register 330 and read out to the external circuit.

*Detailed description*

Certain items of apparatus, such as clocks, flip flops and the like, called out in the following paragraphs are well known to those skilled in the art of data processing. Since these components, as such, do not form part of my invention, they are described in broad terms of function in order to simplify the present description.

*Receiving and converting trains of impulse signals.*—Referring to FIG. 1, I provide a source of impulses, such as a telephone type dial 150, having a pair of normally closed contacts 151. The dial includes mechanism (not shown) operative for impulsing contacts 151, i.e., causing contacts 151 to carry out one or more consecutive openings and reclosings. Means indicated by the broken lines connected to contacts 151 is provided for connecting contacts 151 in series with the upper and lower windings of pulsing relay 100 within termination 10 and the aforementioned battery. Therefore, when the dial-to-relay connection has been completed, relay 100 is normally operated by current flowing through its windings and the pulsing contacts 151.

When contacts 151 are impulsed, relay 100 is released and reoperated in response to each opening and reclosing of dial contacts 151. Break contacts 101 are therefore closed upon release of relay 100 in order to indicate each pulse within a train of impulses generated by dial 150, and contacts 102 are reclosed at the end of each impulse in each train of impulses in order to mark the end of the impulse. Impulses generated in this manner by contacts 101 and 102 are utilized by succeeding equipment in a manner to be described next.

Relay 100 in operated condition is effective prior to the transmission of impulses from dial 150 for closing an obvious circuit for operating release delay relay 110 at make contacts 102. Relay 110 is a slow release type, and therefore is maintained in its operated condition during each release of relay 100 while an impulsing operation of relay 100 is being carried out, even though the operating circuit of relay 110 is momentarily opened at contacts 102 during the receipt of each impulse at relay 100.

Relay 110 in operated condition is effective for preparing an operating circuit for shunt relay 120 at make contacts 111. Upon the operation of relay 110 and the release of relay 100 occasioned by each opening of dial contacts 150, the circuit for operating relay 120 is completed from ground through break contacts 101, make contacts 111, and the winding of relay 120 to battery. Therefore, relay 120 is operated upon the first release of relay 100 during the recipt of a train of impulses from dial contacts 151. Owing to the fact that it is a slow release type, relay 120, once operated, is thereafter maintained in operated condition throughout the receipt of an impulse train by relay 100. At the end of the last impulse in a train received from dial contacts 150, relay 100 is held in its operated condition, so that the operating circuit of relay 120 is opened at break contacts 101 for a length of time sufficient to allow relay 110 to release.

From the above considerations, it is to be seen that when relay 100 is impulsed and upon the operation of relay 120, ground impulses are passed from contacts 101 on relay 100 to the input of counting circuit 130 through make contacts 122 and over conductor 140. Similarly, impulse-end marking ground signals are transmitted to counter 130 through make contacts 123 and conductor 141.

Counter 130 is of the well-known shift type and includes elements 133, 135 and 144 as well as series of signal storing means, such as ferrite cores which are indicated collectively in FIG. 1 as core 132. Each of elements 133, 135 and 144 has an input and an output and is operative in response to ground signals present on its input for producing corresponding negative signals on its output.

Each of the aforementioned ferrite cores 132 includes input, linking, read, and output windings, such as 134, 136, 138 and 137, respectively. The input and output of element 135 are connected to conductor 140 and to input winding 134 of the first core in the series, respectively. With this arrangement it is to be seen that application of a first ground signal to conductor 140 is effective to cause core 132 to be shifted from its normal "0" condition to its "1" condition.

Linking winding 136 of each core, including the first in the series, is connected to the input winding of the next succeeding core in the series by means including switch 142, which has a control input, is normally nonconductive. Switch 142 is made conductive (i.e., effective to pass signals from one core to the next) only when a negative signal is present on the output of element 133. In order to control the passage of signals through the series of cores within counter 130, the input of element 133 is connected to conductor 141, on which ground end-of-impulse signals are applied, and the output of element 133 is connected directly to the control conductor of each switch 142 and through unidirectionally conductive means, such as diode 145, to read windings 138 of memory cores within counter 130. With this arrangement, the first core is again shifted from its operated "1" condition to its normal "0" condition and the shift pulse is passed through the switch intermediate to the first and second cores 132 in the series at the conclusion of the first impulse received at termination 10. In the same manner, succeeding ground impulses applied successively to conductors 140 and 141 which indicate other impulses in the same train received at termination 10 are effective for causing an impulse to be read into the first memory core 132 and signals already stored within the remaining cores 132 of the series to be shifted into the next successive core 132 of the series. At the end of the train of impulses transmitted to termination 10, the core 132 of the series which correspond in number to one more than the number of impulses transmitted from dial contacts 151 left in its "1" condition, all other cores in the series being in their "0" condition.

The apparatus for reading signals stored in the cores 132 of counter 130 is next described. Output winding 137 of each core 132 except the first within counter 130 is connected to the corresponding one of the counter output conductors, shown collectively as 131, by means including a ferrite switch, such as 143. Switch 143 is normally maintained in its open condition and is closed (i.e., effective to pass signals from the output windings of cores 132 in the direction of conductors 131) upon the application of a signal to its control conductor.

In order to supply readout signals to all cores 132 and to close all switches 143 within counter 130, the input of element 144 is connected to the output of the aforementioned gate 155, and the output of element 144 is connected directly to the control conductors of all switches 143 and through unidirectional conducting means such as diode 146 to the read winding 138 of all cores 132. From the above paragraphs, it is to be recalled that a ground signal is applied to the output of gate 155 at the conclusion of transmission of an impulse train from dial contacts 150. Gate 155 is effective in response to the application of a signal to its control input over conductor 202 for passing the ground signal from termination 10 to the input of element 144. The apparatus for applying a signal to conductor 202 is set forth under the heading "Controlling the Passage of Signals Through Stage 21." Assuming that signals now exist on both inputs of gate 155, the resulting read signal applied to all of cores 132 by element 144 is effective for causing the particular one of cores 132 left in "1" condition at the conclusion of the signal storing operation to be restored to its normal "0" condition at this time and to pass the read signal through the corresponding ones of output windings 137 and switches 143 to the corresponding one of output conductors 131.

Each of cores 132 within counter 130 is also provided with a sensing winding 139. At the same time that the above-described read pulse is passed through any core 132 to output winding 137, a similar impulse is generated on winding 139 and applied to gate 229 within first register stage 21 over conductor 160. The purpose of the sensing signal or impulse is described in connection with the transfer of information from stage 21 into a succeeding register stage.

In this manner, it is seen that the trains of digit impulses are converted into binary signals distributed among output conductors 131. The signal on the selected one of output conductors 131 is transmitted to the FIG. 2 shift register where it is utilized in the manner next set forth.

*Receiving signals in the shift register first stage.*—The shift register of FIG. 2 includes a plurality of stages, such as first stage 21, intermediate stage 22, and last stage 23. The various stages include substantially identical first storing units, such as 210, which are hereinafter referred to as "permanent." All stages, save the last, include a second storing unit succeeding the permanent storing unit, such as 230, which is hereinafter referred to as "temporary."

Turning first to the consideration of permanent storing unit 210 of the first stage, unit 210 includes a group of bistable ferrite cores, such as 239. Each core 239 corresponds to one of the memory cores within counter 130 and to one of output conductors 131 and includes input, output, read, and sensing windings, such as 237, 235, 241, and 242, respectively. Each of conductors 131 incoming to unit 210 from counter 130 is connected to input winding 237 of the appropriate one of cores 239, so that the aforementioned positive signal incoming to storing unit 210 passed by switch 234 is effective to drive the appropriate one of cores 239 to its "1" condition.

A signal stored within unit 210 is to be moved into temporary storing unit 230 before it is passed from first stage 21 to the next succeeding stage 22 of the FIG. 2 register. Temporary storing unit 230, like permanent storing unit 210, includes a plurality of ferrite memory cores, such as 238, each core 238 corresponding to a particular one of cores 239 within permanent storing unit 210. Each core 238 includes input, output, and read windings, such as 243, 244, and 236, respectively. Output winding 235 of each core 239 in permanent storing unit 210 is connected by means including switch 234 to input winding 243 of the appropriate core 238 within temporary storing unit 230 by means such as ferrite switch 234. Similarly, output winding 244 of each core 238 in temporary storing unit 230 is connected by means such as ferrite switch 233 to the appropriate input of the next succeeding register stage. Switches 234 and 244, which have control electrodes, are normally open (i.e., not capable of passing signals to or from windings 243 or 244, respectively) so that a signal can be put into or taken from core 238 without applying a signal to the input of the next succeeding register stage or to the output winding 235 of core 239 within permanent storing unit 210, respectively. However, switches 234 and 244 are made conductive (i.e., effective to pass signals to or from core 238) upon the application of positive signals to their control inputs.

From the above description, it is to be seen that a signal that has been put into permanent storing unit 210 via conductors 130 can be passed to temporary storing unit 230 if an impulse is applied to read winding 241 of core 239 at the same time that a signal is applied to the control element of switch 234. Further, core 239 storing the signal is restored from its "1" to "0" condition by such a read impulse, so that core 239 is thereafter ready to receive further signals from counter 130. Similarly, if one of cores 238 has stored therein a signal transmitted from permanent storing unit 230, such a signal can be passed into the permanent storing unit of the next succeeding register stage if a read signal is applied to read winding 236 at the same time that a signal is applied to the control conductor of switch 233. Again, core 238 is restored from its "1" to "0" condition by the application of a read impulse winding 236, so that core 238 is again prepared to receive signals subsequently transmitted thereto from permanent storing unit 210.

*Controlling the passage of signals through A register stage.*—Referring to FIG. 3, signals for driving the read windings of cores within the various register stages including 21 and within counter 130 are provided in the manner next set forth. Free-running oscillator 300 is effective for providing a sine wave signal at the rate of 100 cycles per second to the input of master clock 301. Clock 301 is driven by the input signal, and in turn, produces at its output conductors 302 and 303 relatively narrow square wave impulses at the rate of 100 cycles per second. Clock 301 is further arranged so that impulses are alternately produced on conductors 302 and 303. Impulses on conductors 302 and 303 are hereinafter referred to as "A" and "B" impulses, respectively.

Conductor 302 is connected, among other places, to switches 234 intermediate the output winding 235 of core 239 within permanent storing unit 210 and input winding 243 of core 238 within temporary storing unit 230. Conductor 303 is connected, among other places, to read winding 236 of core 238 and to switch 233 which links output winding 244 of core 238 within temporary storing unit 230 to the next succeeding stage of the shift register. Further, conductor 302 is connected to the series-connected read windings 236 of cores 238 within temporary storing unit 230. It is to be seen that any transfer of signals between permanent storing unit 210 and temporary storing unit 230 must be accomplished during the time that switch 234 is closed by application of an A impulse to its control input. The occurrence of a B impulse on conductor 303 is effective for applying a read signal to all read windings 236 of cores 238 within temporary storing unit 230 and any resulting signal on output winding 244 of any core 238 is thereupon passed to the input of the next stage of the register because switch 233 is closed in coincidence with a signal produced in winding 244.

From the above description it is to be seen that signals, once passed to temporary storing unit 230, are subsequently fed into the next succeeding stage of the register. Since a signal may already be stored in one of the storing cores within that succeeding stage, it is necessary to prevent passage of signals into the succeeding stage if signal adding within any stage is to be avoided. Accordingly, the control of flow of signals through first storing stage 21 is effected by controlling the application of read signals to read winding 241 of cores 239 within permanent storing unit 210. To this end, logic or control circuit 220 is provided individual to stage 21 and particularly to permanent storing unit 210 within that stage. Because the logic circuits are substantially identical for all stages except as noted, a detailed description is given only for the first stage in order to avoid needless repetition.

Logic circuit 220 includes a first "and" gate such as a ferrite core 221. Gate 221 is bistable and includes signal and reset inputs 223 and 224, respectively. Application of signals to inputs 223 and 224 is effective for shifting gate 221 between its normal, "0" condition and "1" condition, respectively. In the same manner as the ones previously mentioned, operation of the gate from "1" to "0" condition is effective for producing a signal on the gate output. The aforementioned conductor 302 bearing A impulses from clock 301 is connected to signal input 223. Assuming that gate 221 is in its "1" condition at this time, the next A impulse applied to input 223 is passed through gate 221 and amplifier 227 and passed through the series connected read windings 241 of all cores 239 within permanent storing unit 210. It is to be recalled that switch 234 within the temporary storing unit 230 is closed at this time, so that any one of cores 239 previously operated to "1" condition by an impulse from counter 230 is shifted back to its "0" condition and a signal from winding 235 is passed to the input of the corresponding core 238 within temporary storing unit 230. The same shift of condition in any of cores 239 is also effective for producing a coincident signal on sensing winding 242 of the same core which is passed through amplifier 249. Signals on the output of amplifier 249 are used within the next succeeding register stage for purposes which will become significant later in this description.

Logic circuit 220 is also provided with a second bistable gate 222 having signal and reset inputs 228 and 226, respectively. Gate 222 is similar in operation to that described for gate 21. The output of amplifier 227, in addition to being applied to windings 241 of the cores within storing unit 210, is also applied to reset input 226 of gate 222. Assuming that gate 222 has been in its "0" condition, it is placed in its "1" condition upon the passage of an A impulse through gate 221 and amplifier 227. Signal input 228 of gate 222 is connected to the aforementioned conductor 303, so that gate 222 in its "1" condition is effective for passing the B impulse present on conductor 303 which next succeeds the aforementioned A impulse. The B impulse passed by gate 222 is further passed through normally enabled inhibiting gate 229 and the upper input of "or" gate 231 to reset input 224 of gate 221. The application of the B impulse to reset input 224 of gate 221 is effective to reset gate 221 to its "1" condition in anticipation of the next occurring A impulse on conductor 302. In this manner impulses coincident with A impulses occurring on conductor 302 are applied to the read windings of coils 239 within permanent storing unit 210, so that any signal stored within the various memory elements or cores of storing unit 210 are read out to temporary storing unit 230 from whence they are passed in the previously described manner to the succeeding stage.

At this point the explanation of how signals are fed from counter 130 into stage 21 can be completed. It is to be recalled that gate 155 associated with counter 130 is to be enabled in order to pass signals to element 144 within counter 130 which in turn provides a read signal to the various storing elements of counter 130 and closes the switches such as 143 between output winding 137 of cores 232 and conductors 131. It is further obvious that such signals produced on output conductors 131 cannot occur at a time when a signal is to be held within permanent storing unit 210 upon the occurence of the next B and A impulses on conductors 303 and 302. In order to avoid adding a signal incoming from counter 130 to one already stored in unit 210, conductor 202, which controls gate 155, is coupled to conductor 303 by means including the signal inputs and outputs of gates 222 and 229. In this manner it is to be seen that the signals produced on any of conductors 131 are in time coincidence with a B impulse on conductor 303, and further, are presented to the input of permanent storing unit 210 at a time when none of cores 239 is holding a signal for subsequent transmission to temporary storing unit 230.

Returning to the consideration of inhibiting gate 229, signal input 229*a* of gate 229 is connected to conductor 160. It is to be recalled that counter 130 is effective upon the production of a signal on any of conductors 131 for producing a coincident signal on conductor 160. Gate 229, in response to the application of a signal to input 229*a*, is effective for blocking the passage of signals from the output of gate 222 to reset input 224 of gate 221.

If the appearance of a B signal on conductor 303 results in the passage of a signal from counter 130 into permanent storing unit 210 within stage 21 which is to be retransmitted from unit 210 into temporary storing unit 230 upon the appearance of the next or a succeeding A impulse on conductor 302, gate 221 must be reset by a B impulse applied to gate reset input 224 over an alternate path. Since the passage of a signal from storing unit 210 to temporary storing unit 230 is dependent upon the readiness of the next succeeding stage to receive such a signal, the reset impulse for gate 221 now must come from the next succeeding register stage. Accordingly, alternate path means (such as conductor 251, in the case of stage 22) similar in function and connection to the above-described conductor 202 is provided in each of the succeeding register stages for providing B impulses to the second, lower input of "or" gate within the next preceding stage which corresponds to gate 231 at times when the passage of signals through the upper input of gate 231 has been blocked by the gate equivalent to gate 229 of the next preceding stage. The occurrence of a signal on the output of the gate corresponding to inhibit gate 229 within the next succeeding stage indicates that the logic circuit within that stage is in the process of normally resetting its gate corresponding to gate 221, and that the succeeding stage will have moved any signals contained therein into a subsequent stage at the time the next A impulse is generated on conductor 302. Conversely, the absence of a B impulse on conductor 251 indicates that the next succeeding stage 22 currently may be storing a signal in its permanent storing unit, and that the signal stored within permanent storing unit 210 is not to be moved out until the signal within the stage under consideration has been retransmitted.

Returning to the case of passing signals from stage 21 to stage 22, assuming that gate 229 is currently operative for blocking the passage of B impulses through gate 222, the B impulse on conductor 251 is passed through the lower input of "or" gate 231 to reset input 224 of gate 221. Consequently, any signal stored within unit 210 is read out upon the appearance of the next A impulse on conductor 302, because that A impulse is passed through now reset gate 221 to the read winding 241 of the cores 239 in unit 210. The absence of such B pulse of the alternate path causes the control unit to withhold readout impulses from storing unit 210 until (1) an impulse is later received over conductor 251 or (2) a readout impulse is received over conductor 266 from apparatus yet to be described.

Assuming that the passage of B impulses through gate 229 has been blocked during the occurrence of one or more such impulses on conductor 303, when gate 221 is again enabled to pass A impulses in either of the above-mentioned ways, the first such A impulse is applied through amplifier 227 to reset input 232 of gate 229. The application of an impulse to input 232 is effective for again enabling gate 229 to pass impulses subsequently passed thereto from gate 222. In this manner the normal cyclical operation of gates 221 and 222 is again established after signals have been held in stage 21 or any other stage during the occurrence of several clock 301 output pulse sequences.

With the above-described arrangement of translating and registering equipment, the continued operation of counter 130 results in a series of corresponding signal translations and the sequential application of such signals to output conductors 131. Upon the application of as many signals to the output conductors 131 as there are stages in the FIG. 2 shift register, it follows from the above description that such signals are shifted through the various register stages of the FIG. 2 register until a signal has been stored within each stage.

*Spilling stored signals to the load.*—From the foregoing description, it is obvious that within the first stage gate 221 continues to transmit a impulse to storing unit 210 cores until the time unit 210 has therein a signal which it cannot move out to its temporary storing unit 230 and to the succeeding stage. At this point the above-described cyclical operation of gates 221 and 222 is interrupted by the application of the inhibiting signal over conductor 160 and the absence of a signal from the previously described alternate path within the next succeeding stage for resetting gate 221.

Therefore, the absence of A impulses on the output of gate 221 and amplifier 227 can be used as an indication that the stages of the register are full. In order to take advantage of this relationship, which exists in first stage 21 only, the output of amplifier 227, in addition to its above-described connections to cores 239 of storing unit 210 and reset inputs of gates 222 and 229, is further connected to the input of inverter 340. Inverter 340 is effective in the presence of continuing A impulses applied to its input for withholding a signal from its output. However, the absence of a single A impulse is effective for causing inverter 340 to produce a single signal on its output. The output signal of inverter 340 is applied to the upper input of flip flop 350. Flip flop 350 is normally maintained energized in its lower half and is reversed upon the receipt of the signal from inverter 340. Flip flop 350, in reversing, is effective for producing a signal on its output which is applied through the upper input of "or" gate 360 to the input of signal generator 365.

Signal generator 365 is operative in the presence of a signal applied to its input for producing on its output a single signal of relatively short duration. The output of generator 365 is coupled directly to lower input 285 of "or" gate 283 within last stage 23 of the shift register which corresponds to "or" gate 231 in the above-described first register stage 21. The impulse from generator 365 is passed through gate 283 to gate 284 within stage 23 which corresponds to gate 221 in first stage 21, thereby causing gate 284 to be reset to its "1" condition and thereafter operative to pass the next occurring A impulse present on conductor 302 through itself and amplifier 286 to permanent storing unit 250 of stage 23. When the optional "C" wiring indicated in FIG. 2 is connected, the output of generator 365 is applied over conductor 266 and through unidirectional conducting means such as diodes 253 individual to each stage in the register to the corresponding lower input of each gate corresponding to 231 within each stage of the register, so that the gates in all stages other than the last corresponding to 221 also are thereupon reset and thereby enabled to pass the next occurring A impulse to the respective ones of the permanent storing units, such as 210. The transmission of an A impulse to all stages in this manner causes the signals held within the permanent storing units individual to the first and intermediate stages to be thereupon read out to the corresponding one of the temporary storing units, and a signal held within the last stage to be read out to register 330, which is a part of the load and described in greater detail hereafter.

While the simultaneous advance of signals from one register stage to another can be achieved by connecting the alternate C wiring in the above explained manner, another scheme for advancing signals from one stage to another within the FIG. 2 register can be effected by omitting the C wiring. When the C wiring is omitted, the first occurring impulse produced by generator 365 in the previously described manner and applied to the lower input of gate 283 within stage 23 is effective for resetting gate 284 as previously described. Upon the occurrence of the next succeeding A impulse on conductor 302 which is passed through gate 284 and amplifier 286, inhibit gate 282 within stage 23 is reset along with gate 281, so that the next occurring B impulse on conductor 303 is passed to the reset input of gate 284 and over the previously described alternate B impulse path to the next preceding stage in order to reset the gate within that preceding stage which corresponds to gate 221 in stage 21. Thus it is seen that the next occurring A impulse on conductor 302 is passed to the permanent storing unit and the inhibit gate reset input within that next preceding stage. Accordingly, the signal stored within the permanent storing unit of the aforementioned next preceding stage is read out to its temporary storing unit and eventually passed to the permanent storing unit 250 within the last stage. In the same manner the other stages preceding last stage 23 in sequence are caused to pass signals upon the occurrence of a reset impulse for the gate within stage 23 which corresponds to gate 221 and to the stage under consideration from the next succeeding stage. It is further pointed out that this type of readout requires the occurrence of two A impulses and two B signals on conductors 302 and 303, respectively, in order to advance a signal from any stage into the next succeeding stage or from last stage 23 into register 330 of the load.

Returning to the consideration of the last stage and to the apparatus shown in FIG. 3, the transmission of a signal over the one of the output conductors of permanent storing unit 250 within last stage 23 to the input of register 330 is effective for energizing the corresponding one of a plurality of bistable elements in register 330 which are analogous to storage cores 132 within counter 130. In order to provide a readout trigger impulse to register 330, master oscillator 300, in addition to driving clock 301, is connected to a second clock 304. Clock 304 includes a signal divider which selects every tenth one of the oscillator 300 signals and produces corresponding signals 0.1 second apart from each other. The output of clock 304 is connected to the read input of counter 130.

Register 330, like counter 130, is of the shift type and is responsive to each signal applied to its read input for producing a signal on its output until the number of output signals so produced corresponds in number to the number of the element within register 330 which has received a signal from permanent storing unit 250 of last register stage 23. The output of register 330 is connected to the input of delay multivibrator 370.

Upon the operation of counter 130, means indicated by the broken lines intermediate register 330 and impulsing relay 380 is effective for connecting the output of multivibrator to the series-connected windings of relay 380 and the battery for the period of time required to retransmit any group of impulse trains stored within the FIG. 2 register. Thereupon multivibrator 370 becomes normaly effective for completing a circuit for operating outpulse relay 370. Multivibrator 370 includes means immediately operative in response to each signal applied to its input for interrupting for .06 seconds the operating circuit of normally operated outpulse relay 380. Thus it is seen that relay 380 follows any train of impulses produced by delay multivibrator 370, the impulse train so produced at contacts 304 being a replica of the one previously received at the input of termination 10.

In its operated condition, relay 380 is effective for completing an obvious operating circuit for delay relay 385 at make contacts 381. Relay 385, a slow release type, is therefore maintained in its operated condition throughout the impulsing operation of relay 380. Relay 385 is effective for preparing an operating circuit for shunt relay 390 at make contacts 386.

Upon the first and each subsequent release of relay 380 during the reproduction of any train of impulses, relay 380 completes a circuit for operating relay 390 by way of break contacts 382 and make contacts 386. Relay 390 in operated condition is effective for maintaining a circuit for resetting flip flop 350 in open condition at break contacts 387. However, upon the reoperation of relay 380 at the conclusion of the impulsing operation of delay multivibrator 370 and relay 380, the operating circuit of relay 390 is opened for a length of time sufficient to allow relay 390 to release. Relay 390 in released condition is effective in response to the continued operation of relay 385 for closing a circuit for resetting flip flop 350 and for reenergizing generator 365. This circuit is traced from ground through break contacts 385, make contacts 383, to the lower input of flip flop 350 and through the lower input of "or" gate 360 to the input of generator 365.

The application of a signal to the lower input of flip flop 350 restores that element to its normal condition, so that it may later respond in the previously described manner to signals from inverter 340. The application of the signal through the lower input of gate 360 to the input of generator 365 is effective for causing generator 365 to produce another read impulse for the FIG. 2 register. Thereupon register 330 is made operative to read out to multivibrator 370 any signal that has been shifted from the FIG. 2 shift register into register 330. In this manner, all signals representing impulse trains are shifted from last stage permanent storing unit 250 into register 330 and reconverted to decimal-base impulses in the external circuit (not shown) which is connected to impulsing contacts 384 of relay 380.

*Alternating steering circuits.*—Sections of the foregoing description are directed to a shift register having logic circuits of a particular type; the logic circuits being individually connected to and effective for steering A impulses into the various permanent storing units of the register in order to control the flow of signals through the register stages. While such logic circuits and storing units represent one embdiment of my invention, other individual logic or steering circuits can be used for controlling the flow of signals through each register stage. Accordingly, two such logic or steering circuits shown in FIGS. 4 and 5 are next described.

The following description is limited to a single stage of a register, it being obvious that the individual circuits to be described can be substituted for any individual logic circuit, such as 220 shown in FIG. 2, in the shift register described in the foregoing sections. It is further assumed that the storing units, both permanent and temporary, which work with the logic circuits to be described are substantially identical in structure and function to the one set forth in the previous section of this description and that signals are passed through the storing units of the shift register in the manner already recited. For this reason, it is not necessary to repeat a detailed description of such a storing unit in order to grasp the principles of operation of the next described logic circuits. For the convenience of the reader, however, FIG. 4 also shows permanent and temporary storing units 410 and 430, respectively, with permanent storing unit 410 being connected to logic circuit 420.

Since a more efficient use of circuit components is achieved in the apparatus set forth in the following paragraphs than in the apparatus described in the foregoing paragraphs, it is necessary to consider the operation of the elements within each steering circuit in greater detail. For simplicity of description, the previously described "0" condition of each bistable ferrite gate is now further defined as polarization in the clockwise direction, and the "1" condition of each core is defined as polarization in the counterclockwise direction.

Figures 4, 5:
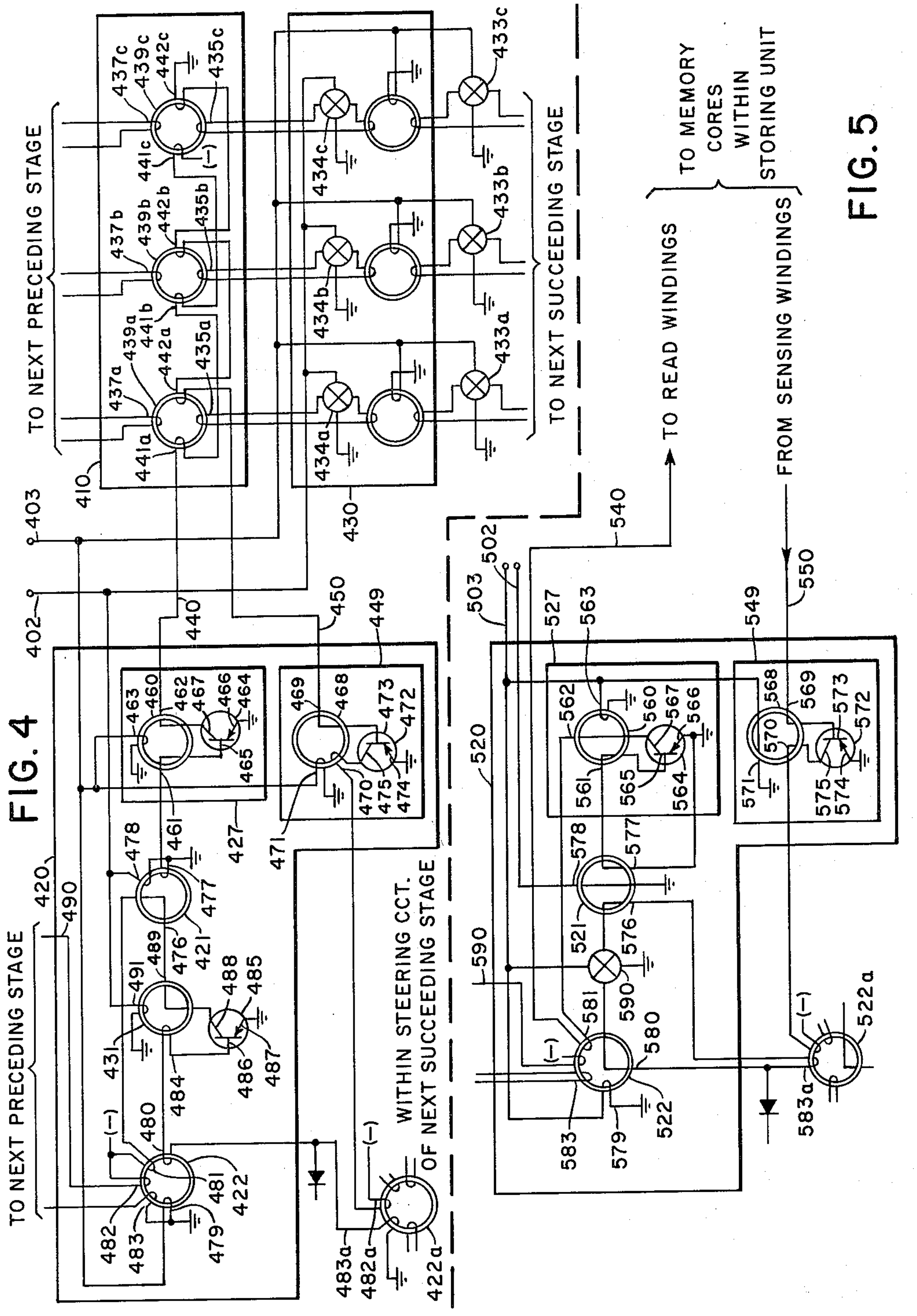
FIGS. 4 and 5 show schematic diagrams of logic circuits and storing units within an individual stage of a shift register.

A and B impulses for driving the FIGS. 4 and 5 logic circuits are supplied over conductors designated 402 and 403, in the case of FIG. 4, and 502 and 503 in the case of FIG. 5. Because both the FIG. 4 and FIG. 5 logic circuits require driving impulses similar to the ones produced by clock 301, conductors 402 and 403 are assumed to be connected by means (not shown) to conductors 302 and 303, respectively, and conductors 502 and 503 are assumed to be connected by other means (not shown) to conductors 302 and 303.

Turning first to FIG. 4, logic circuit 420 includes first and second amplifiers 427 and 449 which are similar in function to amplifiers 227 and 249, respectively. Amplifier 427 includes ferrite core 460 having input, output and reset windings 461, 462 and 463, respectively, and PNP type transistor 464 which includes emitter 466, base 465 and collector 467. Emitter 466 is connected to ground, and base 465 is connected through input winding 461 of core 460 to the input of amplifier 427. Collector 467 is connected through output winding 462 of core 460 to output conductor 440 of amplifier 427. The output of amplifier 427 and, therefore, collector 467 are connected through the various read windings of permanent storing stage 410 to battery.

Assuming that core 460 is in its "1" condition, a negative-going pulse applied to the input of amplifier 427 and base 465 drives transistor 464 into hard conduct condition between emitter 466 and collector 467. Core 460 is driven from its "1" to "0" condition by the resulting current impulse flowing in windings 461 and 462. The same current impulse appears on output conductor 440 and is applied to the read windings of cores within permanent storing unit 410. Impulses from amplifier 427 applied to read windings within storing unit 410 are effective in the manner previously described for causing a signal stored in any one of those cores to be read out to temporary storing unit 430, and for producing a sensing impulse on conductor 450.

Winding 463 is connected to conductor 403 so that a B impulse present on conductor 403 after the above-described production of a read impulse on conductor 440 is effective for restoring core 460 to its "1" condition. Thus it is seen that amplifier 427 is capable of producing read impulses on its output which are non-coincident with B impulses present on conductor 403.

Amplifier 449 which includes cores 468 having input, output and reset windings 469, 470 and 471, respectively, and PNP type transistor 472 which includes base 473, emitter 474 and collector 475. Conductor 450 is used for connecting the sensing windings of the cores with permanent storing unit 410 through input winding 469 to base 473 of transistor 475. Emitter 474 of transistor 475 is connected to ground, while collector 475 is connected through output winding 470 and the output of amplifier 449 to battery via the inhibit winding of gate 482*a* of the core gate within the next succeeding stage which corresponds to core 422. Accordingly, when a negative-going sensing impulse is produced by permanent storing unit 410, the base of transistor 472 is swung negative with respect to emitter 474 sufficiently to drive transistor 472 into its hard conduct condition between emitter 474 and collector 475, and core 468 is driven to its "0" condition by the resulting current impulse in winding 470.

Reset winding 471 on core 468 is connected to conductor 403. Accordingly, the B impulse next occurring on conductor 403 after the passage of a sensing impulse through amplifier 449 is effective for restoring core 468 to its "1" condition. Thus it is to be seen that amplifier 427 is effective for passing to the next succeeding stage sensing impulses which are non-coincident with B impulses present on conductor 403.

Logic circuit 420 also includes cores 421 and 422 which function as "and" gates. Gate 421, like gate 221 in the previously described logic circuit 220, is used for admitting A impulses to the input of amplifier 427. Accordingly, winding 478 of core 421 is connected to conductor 402. It is assumed for the present that no signal has been passed to permanent storing unit 410, so that no inhibit impulse is received over conductor 490 at logic circuit 420.

Assuming that core 421 is in its "1" condition, the next occurring A impulse present on conductor 402 is effective for driving core 421 to its "0" condition and thereby producing an impulse on output winding 477 which is connected to the input of amplifier 427. Amplifier 427 passes the A impulse to the read windings of permanent storing unit 410 in the previously mentioned manner.

Logic circuit 420 also includes ferrite core 431, which is used to carry out substantially the same function as "or" gate 231, and is effective for admitting resetting B impulses to core 421. Accordingly, core 431 has a reset winding 491 connected between conductor 402 and ground. The same A impulse applied to winding 478 of core 421 is also effective for placing core 431 in its "1" condition. The use of core 431 is more fully described in the following paragraphs.

Following the production of the impulse on the input of amplifier 427, the next succeeding B impulse on conductor 403 is applied to input winding 479 on core 422. Assuming that core 422 is in its "1" condition prior to the reception of the B impulse, core 422 is thereupon driven to its "0" condition and produces an impulse on its output winding 480. One side of winding 480 is connected to ground by way of an alternate path which includes winding 483*a* on the core 422*a* in the next succeeding stage of the register and which corresponds to core 422 in stage 420, while the other side of winding 480 is connected through input winding 484 to base 486 of transistor 485. Transistor 485, a PNP type, has its emitter 487 connected to ground and its collector 488 connected to battery through reset windings 489, 476 and 481 on cores 431, 421 and 422, respectively. The aforementioned negative-going impulse connected between base 486 and emitter 487 of transistor 485 swings base 486 sufficiently negative with respect to emitter 487 to place transistor 485 in its hard conduct condition between emitter 487 and collector 488. The resulting current impulse flowing through the series-connected reset windings 489, 476 and 481 to battery is sufficient to reset cores 421, 422 and 431. Cores 421, 422 are therefore placed in their "1" condition, while core 431 is restored to its "0" condition.

The shift of core 422 from "1" to "0" condition also is effective for generating an impulse in sensing winding 483. One side of winding 483 is connected to ground, the other side of winding 483 being connected to the "or" gate corresponding to core 431 within the steering circuit of the next preceding stage. In this manner logic circuit 420 also provides B impulses to the next preceding stage over an alternate path when permanent storing unit 410 is in condition to receive signals from the next preceding stage.

In this manner cores 421, 422 and 431 are alternately driven between their "0" and "1" conditions by the continuing A and B impulses on conductors 402 and 403 so long as no signal is transmitted to permanent storing unit 410 from the preceding register stage. The continued operation of core 421 between its "0" and "1" conditions causes A impulses to continue to be supplied to the various read windings of the storing unit 410 cores.

The operation of logic circuit 420 during the interval when signals are passed into permanent storing unit 410 is next described. The stage of the shift register next preceding the one shown in FIG. 4 includes an amplifier substantially identical to 449, and is similarly effective for producing a negative-going sensing or inhibiting impulse on conductor 490 each time a signal is read out from the permanent storing unit of that stage. As in the case of the FIG. 2 shift register, such an inhibit impulse is in substantial coincidence with the read signal passed or read out to the input of permanent storing unit 410. Conductor 490 is connected through inhibit winding 482 on core 422 to battery in such a direction as to tend to hold core 422 in its "0" condition.

From the above paragraphs, it is to be seen that the reset impulse applied to winding 481 subsequent to the occurrence of the last B impulse prior to the receipt of the inhibit signal over conductor 490 restored core 422 to its "1" condition. The inhibiting impulse applied to winding 482 is effective for restoring core 422 to its "0" condition, so that no impulse is produced on output winding 480 when the next occurring B impulse is applied to winding 479 of that core. As a result of core's 422 failure to produce a reset impulse for core 421, the production of output impulses from core 421 and consequently amplifier 427 is interrupted at this point unless a resetting B impulse is supplied to cores 431, 421 and 422 over the alternate path which includes winding 483*a* of the logic circuit of the next succeeding stage.

Output winding 480 is connected in the previously described manner to the input winding of core 431 through sensing winding 483*a* on core 422*a* which is within the next succeeding stage and which corresponds to core 422. If the next succeeding stage is in condition to receive signals in its permanent storing unit upon the occurrence of the A impulse following the receipt of the inhibit impulse on conductor 490, the logic circuit within that next succeeding stage which includes core 422*a* is functioning in the above-described normal manner, i.e., is shifted to "0" condition upon the occurrence of the B impulse next succeeding the time of receipt of the conductor 490 impulse. Consequently, the B impulse blocked from passage through core 422 in the above-described manner is passed through winding 483*a* of core 422*a* in a manner similar to the one described above in connection with the production of an impulse in winding 483. The impulse produced in winding 483*a* which is applied through windings 480 and 484 to base 486 of transistor 485. Consequently, transistor 485 is again caused to produce an output impulse for resetting cores 431, 421 and 422, so that the next A impulse occurring on conductor 402 is passed through core 421 and amplifier 427 to the read windings of the permanent storing unit 410 cores and any signal stored within unit 410 is thereupon passed, in the previously described manner, to temporary storing unit 430 and thence into the next register stage.

In the event that the core corresponding to 422 within the next preceding stage is not being pulsed owing to the fact that its corresponding permanent storing unit already has therein a signal which cannot be read out, the failure of the core 422*a* within the next succeeding stage to pass the B impulse through winding 483*a* is sufficient to stop the normal operation of logic circuit 420, so that core 421 is not reset to its "1" condition. Consequently the production of read impulses for use in permanent storing unit 410 is also stopped. Only when an impulse is again applied through winding 480 by apparatus similar to that described in the preceding sections is logic circuit 420 again made operative to produce read impulses for the cores of permanent storing unit 410.

The second alternate logic circuit 520 shown in FIG. 5 is next described. Logic circuit 520, like the ones shown in FIGS. 2 and 4, includes first and second amplifiers 527 and 549, respectively. Amplifier 549 is substantially identical to 449 described above, and is therefore not described in detail here. Its function, like that of 449, is to relay sensing or inhibit impulses from the permanent storing unit individual to logic circuit 520 to the logic circuit of the stage next succeeding the one shown in FIG. 5 in coincidence with signals passed from the permanent storing unit of the stage including logic circuit 520. Amplifier 527, on the other hand, has functions in addition to those set forth in connection with amplifier 427 described in the above paragrapphs, so that the operation of amplifier 527 is described in connection with the remaining components of logic circuit 520.

Logic circuit 520 includes first and second ferrite core gates 521 and 522, respectively. Like gate 421 in the FIG. 4 logic circuit described above, core 521 is normally operative for passing A impulses present on conductor 502 through amplifier 527 to the read windings of the permanent storing unit cores individual to logic circuit 520. Assuming for the present that core 521 is in its "1" condition, the application of an A impulse from conductor 502 through winding 578 on that core is effective for driving the core to its "0" condition, and consequently producing an impulse on output winding 577 of core 521. This output impulse is applied through input winding 561 on core 560 within amplifier 527 to base 565 and emitter 566 of transistor 564 of that amplifier. Consequently, transistor 567 is driven to its hard conduct condition between emitter 566 and collector 567 and passes an impulse through reset windings 562 on core 560 and 581 on core 522 and conductor 540 to the read windings of the cores of the permanent storing unit connected to conductor 540 to battery (not indicated in the drawing). The impulse passing through winding 581 also is effective for driving core 522 into its "1" condition.

Conductor 503 is connected to reset winding 563 of core 560. Upon the production of the next B impulse on conductor 503, the passage of the impulse through winding 563 restores core 560 to its "1" condition, so that core 560 within amplifier 527 is prepared to pass the next occurring A impulse passed through core 521. The manner in which core 521 is reset in preparation for the aforementioned A impulse is next described.

Conductor 503 is also connected to input winding 579 of core 522. As set forth above, the A impulse passed from amplifier 527 to conductor 540 also is effective for driving core 522 from its "0" condition to its "1" condition, and therewith prepares core 522 for the passing of the next occurring B impulse on conductor 503. Consequently, the same B impulse that is effective in the above-described manner for resetting core 560 within amplifier 527 also is effective for driving core 522 from its "1" to "0" condition. This change of condition is effective for producing an impulse in output winding 580 on core 522.

Output winding 580 of core 522 is connected to input winding 576 of core 521 through switch 590 and winding 583*a* on core 522*a*, which is in the logic circuit of the stage next succeeding the stage containing circuit 520 and which corresponds to core 522. This connection is made in such a manner that the impulse applied to the left-hand terminal of switch 590 is negative-going with respect to ground. Switch 590, which may be of a saturable ferrite type, has a control input to which conductor 503 is connected. Switch 590 is enabled upon the occurrence of each B signal on conductor 503 to pass signals from winding 580 to winding 576. As a result, the aforementioned impulse produced in winding 580 of core 522 is applied to reset winding 576 of core 521 and drives core 521 from its "0" to "1" condition. At this time core 521 and amplifier 527 are again prepared to pass the next occurring A impulse present on conductor 502 to the read windings of the permanent storing unit cores individually connected to conductor 540.

This change from "1" to "0" condition of core 522 also is effective for producing an impulse in winding 583 such that the winding's left-hand terminal becomes positive with respect to its right-hand terminal for the duration of the impulse. In this manner a B impulse is supplied to the stage next preceding the one containing logic circuit 520 over a path alternate to the one already in that stage. The use of the alternate path impulses is more fully discussed below.

The condition of each of cores 521 and 522 is reversed in the above-described manner upon the occurrence of A and B impulses so long as no signal is passed to the permanent storing unit cores individually associated with logic circuit 520. Upon the passage of such a signal, the operation of logic circuit 520 is modified in the manner next described.

The register for which logic circuit 520 is made is similar to the one described in connection with the FIG. 2 shift register 220 in that the passage of a signal into a permanent storing unit of any stage from the next preceding stage is effective for interrupting the above-described normal alternate operation of cores 521 and 522. In order to accomplish this in circuit 520, a sensing or inhibit impulse, similar to the one produced on the output of amplifier 549 or on conductor 160 and described in connection with counter 130, is applied to inhibit conductor 590 upon the passage of a signal from permanent storing unit within the next preceding stage into the temporary storing unit individually connected to that stage. It is to be recalled from the foregoing sections that the impulse present on an inhibit conductor such as 590 is produced substantially in coincidence with a particular A impulse. The application of the inhibit impulse to winding 582 is effective for urging core 522 from its "1" to its "0" condition, i.e., opposite to the condition to which core 522 has been driven by the reset impulse applied to winding 581 in the above-described manner. Consequently, core 522 is not shifted to its "0" condition upon the occurrence of the B impulse following the receipt of the inhibit impulse over conductor 590, with the result that no output impulse is supplied from winding 580 to the input winding 576 of core 521. Under these conditions core 521 is not reset from impulses supplied by core 522.

At this time, a resetting operation of core 521 is to be effected only if the stage next succeeding the one which includes logic circuit 520 is to be in condition to receive impulses produced within the permanent storing unit individually connected to logic circuit 520 upon the occurrence of the next A impulse on conductor 502. This condition, as in the case of logic circuits 520 and 210 described above, is indicated by the shift of core 522*a* within the logic circuit of the stage next succeeding the stage containing logic circuit 520 from "1" to "0" condition upon the occurrence of the same B impulse which has been blocked from passage through core 522 in the above-described manner. To this end, a B impulse is produced in core 522*a* in the same manner as the one produced in winding 583 of core 522 and described above in connection with the passage of a B impulse through core 522. Impulses produced in winding 583*a* are applied through winding 583 and switch 590 to winding 576 of core 521. Since the polarity of this pulse supplied over the above-traced alternate path including winding 583 is the same as the pulse supplied to core 521 by winding 583, it is effective for shifting core 521 into its "0" condition. Under this condition, after an inhibit signal has been received from the stage preceding the one including logic circuit 520, core 521 passes the A impulse next occurring on conductor 502 after receipt of an inhibit signal on conductor 590 to the read windings of the permanent storing unit individually connected to logic circuit 520. As a result a signal stored within the permanent storing unit individual to logic circuit 520 is read out and ultimately passed to the next succeeding stage upon the occurrence of the above-mentioned A impulse.

In the event that the gates within the stage next succeeding the one including logic circuit 520 also are blocked by the fact that signals stored within that stage are not to be passed to succeeding stages upon the occurrence of the next A impulse, core **522*a* is ineffective for passing the aforementioned particular B impulse. Consequently, no impulse is produced in winding 583*a*, so that the above-described impulse over the alternate path is not applied to reset winding 576 of core 521. Therefore, core 521 remains in its "0" condition and is ineffective to pass the above-mentioned next occurring A impulse to the read windings of the permanent storing unit connected to conductor 540. Logic circuit 520 remains blocked in this manner until a read impulse is supplied by apparatus similar to that described in connection with the FIG. 2 register is received by logic circuit 520**.

*Summary*

In the foregoing description, I have set forth a shift register for receiving each of a series of signals from a counter source. I have shown how each of the serially arranged stages of the shift register has an input and an output and is provided with first, permanent, and second, temporary, storing units, each storing unit in each stage having at least one means such as a ferrite core furnished with signal and read inputs and an output which is responsive to a signal applied to its signal input and the subsequent application of an impulse to the read input for producing a signal on its output. It has been set forth that the source is coupled to the signal input of the first storing unit within the first stage, the output of the first and each intermediate stage is coupled to the signal input of the next succeeding stage, and the output of the last stage is coupled to the load. It has been shown that signals incoming to any one stage are held within the permanent storing unit means of that stage until an impulse is applied to the read input of the storing means within that stage.

I have further shown in the foregoing paragraphs how the output of each permanent storing unit means is connected by means including a first switch, which is made operative to pass signals in response to the application of a signal to its control input, for passing signals to the input of the storing means within the temporary storing unit of the same stage. The above description further sets forth how the output of each temporary storing unit means is connected by a means including a second switch to the output of that stage.

The clock set forth in the above description is shown to have first and second outputs and operative for producing signals alternately on its first and second output. In order to make the first switch in each stage operative at a time when impulses are applied to the permanent storing unit means read input and thereby pass stored signals into the storing means of the temporary storing unit input, the first clock output is connected to the control input of the first switch. In order to provide read impulses for the temporary storing unit and to pass the resulting signals on the temporary storing unit means output to the input of the next succeeding stage, the second clock output is shown to be connected to the control input of the second switch and the read input of the temporary storing unit storing means.

I have further shown how each stage of the shift register is provided with a logic circuit for steering read impulses from the first clock output into the permanent storing unit means read input. Particularly, I have shown how the logic circuit includes first and second bistable gates, each gate having signal and reset inputs and being operative in response to the application of an impulse to its reset input for subsequently passing an impulse from its signal input to its output. I have indicated that within each stage means including the signal input and output of the first gate is used for coupling the first clock output to the read input of the first storing unit means and to the reset input of the second bistable gate. I have shown how the signal input and output of the second gate are used for coupling the second clock output to the reset input of the first gate, with the result that the first and second gates are alternately enabled and signals normally are passed from the first clock output to the permanent storing unit of that stage.

I have shown that the permanent storing unit of each stage includes a common sensing output operative in response to the production of a signal on the storing means output of that stage's permanent storing unit for producing an inhibiting signal which is employed to operate inhibiting means individual to the second bistable gate within the logic circuit of the next succeeding stage. It has been shown that the application of a signal to the inhibiting means of that stage is effective for preventing the passage of a signal to the reset input of the first gate of the same stage, with the result that passage of the next occurring impulse on the first clock output after the inhibit signal through the first gate is prevented.

In order to allow any stage to pass a signal from the first unit into its second storing unit whence it is to be passed to the next succeeding stage subsequent to the occurrence of the inhibit impulse mentioned in the preceding paragraph, I have provided within the logic circuit of each stage means operative upon the passage of a signal through that stage's second bistable gate for applying a resetting impulse to the reset input of the first gate within the logic circuit of the next preceding stage wherein the passage of a reset signal may be blocked. Such a reset signal is transmitted over an alternate path through means, such as an "or" gate, to the reset input of the first gate of the logic circuit within the preceding stage. I have further indicated how a signal may continue to be stored within any stage until its next succeeding stage is cleared to receive the impulse stored therein.

While I have shown a general case of a logic circuit suitable for use in the above-described shift register, I have further shown in FIGS. 4 and 5 and described in a foregoing section first and second alternate logic circuits which may be interchanged with the above-described general case.

While I have shown and described in the above sections the preferred embodiment of my invention, other modifications of my invention will readily occur to those skilled in the art. I therefore aim in the claims appended to and forming a part of the present specification to cover all such modifications as fall within the true spirit and scope of my invention.

What is claimed is:

1. In a data storage system, a storing unit including means capable of storing at least one data signal at a time therein, said storing means having a read input terminal and an output terminal and being operative during the storage of a signal therein and in response to the subsequent application of an impulse to said read input terminal for producing a signal on said output terminal, clock pulse means having first and second output terminals operative for alternately producing impulses on said first and said second output terminals, a logic circuit having first and second bistable gates, each of said gates having signal and reset input terminals and an output terminal and being operative subsequent to the application of an impulse to said reset input terminal for passing an impulse applied to said signal input terminal to said output terminal thereof, means including said signal input terminal and said output terminal of said first gate for coupling said first clock output terminal to said storing unit means read input terminal and to said reset input terminal of said second gate, and means including said signal input terminal and said output terminal of said second gate for coupling said second clock output terminal to said reset input terminal of said first gate, whereby impulses from said first clock output terminal are effective to cause said storing unit to read out signals stored therein and to reset said second gate, and impulses from said second clock output terminal are effective for resetting said first gate.

2. In a data storing system, a storing unit including means capable of storing at least one data signal at a time therein and having a read input terminal and an output terminal, said storing unit means being operative during the storage of a signal therein in response to the application of an impulse to said read input terminal for producing a signal on said output terminal, clock pulse means having first and second output terminals, said clock being operative for alternately producing impulses on said first and said second output terminals, a logic circuit having first and second bistable gates, each of said gates having signal and reset input terminals and an output terminal and being operative subsequent to the application of an impulse to said reset input terminal for passing an impulse applied to said signal input terminal to said output terminal thereof, means including said signal input terminal and said output terminal of said first gate for coupling said first clock output terminal to said storing unit read input terminal and to said reset input terminal of said second gate, means including said signal input terminal and said output terminal of said second gate for coupling said second clock output terminal to said reset input terminal of said first gate, and means operative for blocking the passage of impulses through said means including said second gate, whereby each impulse from said first clock output terminal normally is passed to said storing unit means and the flow of impulses from said first clock output terminal to said storing means read input terminal may be stopped upon the operation of said signal blocking means.

3. The data storing system set forth in claim 2 and having in addition alternate means operative for coupling said second clock output terminal to said reset input terminal of said first gate, whereby impulses from said first clock output terminal may continue to be applied to said storing unit means read input terminal subsequent to the operation of said blocking means.

4. The data storing system set forth in claim 2 and having in addition alternate means simultaneously operative with said blocking means, whereby impulses from said first clock output terminal may continue to be applied to said storing unit means read input terminal subsequent to the operation of said blocking means.

5. The data storing system set forth in claim 4 and having in addition means operable independently of said alternate means and at any time other than the one when an impulse is present on said first clock output terminal for applying a signal to said first gate reset input terminal.

6. In a data storing system, a storing unit including means capable of storing at least one data signal at a time therein, said storing means having a read input terminal and an output terminal and being operative during the storage of a signal therein and in response to the subsequent application of an impulse to said read input terminal for producing a signal on said output terminal, clock pulse means having first and second output terminals operating for producing impulses alternately on said first and said second output terminals, a logic circuit having first and second bistable ferrite cores, each of said cores having signal and reset input windings and an output winding and being operative in respose to the application of impulses to said signal and said reset windings for driving said core between first and second conditions, respectively, each of said cores being effective in response to a change from second to first condition for producing an impulse on said output winding, means including said signal and said output windings of said first core for coupling said first clock output terminal to said storing unit means read input terminal and to said reset winding of said second core, in order to pass impulses from said first clock output terminal to said storing unit means read input terminal and to place said second core in its second condition upon the occurrence of each impulse on said first clock output terminal, means including said signal and said output terminal windings of said second core for coupling said second clock output to said reset winding of said first core, in order to place said first core in second condition upon the occurrence of each impulse in said second clock output terminal.

7. The data storing system set forth in claim 6 and having in addition inhibiting means operative for blocking the passage of impulses to said first core reset input winding, whereby the flow of impulses from said first clock output terminal to said storing means read input terminal may be stopped upon the operation of said signal blocking means.

8. The data storing system set forth in claim 7 and having in addition alternate means operative for coupling said second clock output terminal to said first core reset input winding, whereby impulses from said first clock output terminal may continue to be applied to said storing unit subsequent to the operation of said inhibiting means.

9. In a data storing system, a storing unit including means having a read input terminal and an output terminal capable of storing at least one data signal therein, said storing unit means being operative in response to the storage of a data signal therein and to the subsequent application of an impulse to said read input terminal for producing a signal on said output terminal, clock pulse means having first and second output terminals operative for alternately producing impulses on said first and said second output terminals, a logic circuit having first, second and third bistable gates, each of said gates having signal and reset input terminals and an output terminal, each of said gates being operative subsequent to the application of an impulse to said reset input terminal for passing an impulse from said signal input terminal to said output terminal thereof, means including said signal input terminal and said output terminal of said first gate for coupling said first clock output terminal to said storing means read input terminal in order to supply impulses to said read input terminal of said storing device means, means including said signal input terminal and said output terminal of said second gate and said third gate connected in series for coupling said second clock output terminal in series with said reset input terminals of said first and said second gates in order to normally reset said first and said second gates upon the occurrence of each impulse on said second clock output terminal, and means for coupling said first clock output terminal to said reset input terminal of said third gate in order to reset said third gate in preparation for passing the next occurring impulse on said second clock output terminal to said reset input terminals of said first and said second gates.

10. The data storing system set forth in claim 9 and having in addition means operative for inhibiting the passage of impulses through said second gate in order to prevent the passage of signals to said storing unit.

11. The data storing system set forth in claim 9 and having in addition an inhibit input terminal on said second gate, said second gate being rendered inoperative in response to the application of a signal to said inhibit input terminal for passing signals from its signal input terminal to said output terminal thereof, and sensing means operative for applying a signal to said inhibit input terminal, in order to stop the flow of impulses to said read input terminal of said storing unit means subsequent to the operation of said sensing means.

12. The data storing system set forth in claim 11 and having in addition alternate means operative for passing impulses on said second clock output terminal through the series-connected output terminal of said second gate and said signal input terminal and said output terminal of said third gate to said reset input terminal of said first gate, whereby impulses from said first clock output terminal may continue to be applied to said storing unit means read input terminal subsequent to the operation of said inhibiting means.

13. In a data storing system, a storing unit including means having a read input terminal and an output terminal capable of storing at least one data signal therein, said storing unit means being operative in response to the storage of a data signal therein and to the subsequent application of an impulse to said read input terminal for producing a signal on said output terminal, clock pulse means having first and second output terminals operative for alternately producing impulses on said first and said second clock output terminals, a logic circuit having first, second and third bistable ferrite cores, each of said cores having signal and reset input windings and an output winding and being operative in response to the application of impulses to said signal and said reset windings for driving said core between first and second conditions, respectively, said core being effective in response to a change from first to second condition for producing an impulse on said output winding, means including said signal and said output windings of said first core for coupling said first clock output terminal to said storing means read input terminal in order to supply impulses to said read input terminal of said storing device means, means including said signal input winding and said output winding of said second and said third cores connected in series for coupling said second clock output terminal in series with said reset input windings of said first and said second cores in order to normally reset said first and said second cores upon the occurrence of each impulse on said second clock output terminal, and means for coupling said first clock output terminal to said reset input winding of said third core in order to reset said third core in preparation for passing the next occurring impulse on said clock output terminal to said reset input windings of said first and said second cores.

14. The data storing system set forth in claim 13 and having in addition an inhibit winding on said second core operative in response to the application of a signal thereto for changing said second core from second to first condition, and having in addition inhibiting means for applying a signal to said inhibit winding at a time other than the time of occurrence of a signal on said second clock output terminal in order to allow said second core to be made inoperative to pass to said first core reset input impulses occurring on said second clock output terminal and thereby render said first core inoperative to pass signals to said storing unit means read input terminal subsequent to the operation of said inhibiting means.

15. The data storing system set forth in claim 14 and having in addition alternate means operative for passing impulses from said second clock output terminal through the series-connected said output winding of said second core and said signal input winding and said output winding of said third core to said reset input winding of said first core, whereby impulses from said first clock output terminal may continue to be applied to said storing unit means read input terminal subsequent to the operation of said inhibiting means.

16. In a data storing system, a storing unit including means having a read input terminal and an output terminal capable of storing at least one data signal therein and operative in response to the storage of a signal therein and to the subsequent application of a signal to said read input terminal for producing a signal on said output terminal, clock pulse means having first and second output terminals operative for producing impulses alternately on said first and second clock output terminals, a logic circuit including first, second and third bistable gates, each of said gates having signal and reset input terminals and an output terminal, each of said gates being operative subsequent to the application of an impulse to said reset input terminal for passing an impulse from said signal input terminal to said output terminal thereof, means including said signal input terminal and said output terminal of said first gate connected in series with said signal input terminal and said output terminal of said third gate for coupling said first clock output terminal to said reset input terminal of said second gate and to said storing means read input terminal in order to normally transmit impulses from said first clock output terminal to said storing unit means read input terminal and to reset said second gate, a switch having a control input terminal and a signal input terminal and an output terminal operative in response to the application of a signal to said control input terminal for passing impulses between its said signal input terminal and said output terminal thereof, means including said signal input terminal and said signal output terminal of said second gate connected in series with said signal input terminal and said signal output terminal of said switch for coupling said second clock output terminal to said first gate reset input terminal in order to allow impulses from said second clock output terminal normally to reset said first gate, means for connecting said second clock output terminal to said third gate reset input terminal and to said switch control input terminal and to said third gate reset input terminal in order to allow impulses from said second clock output terminal to reset said third gate and to enable said switch to pass signals from said second clock output terminal to said first gate reset input terminal.

17. The data storing system set forth in claim 16 wherein said second gate has an additional, inhibit input terminal and said second gate is responsive to a signal applied to said inhibit input terminal for blocking the passage of signals from its said signal input terminal to said output terminal thereof, and sensing means operative for applying a signal to said second gate inhibit input terminal, whereby the flow of impulses from said first clock output terminal to said storing unit means read input terminal may be stopped upon the operation of said sensing means.

18. The data storing system set forth in claim 17 and having in addition means connected in series with said first gate reset input terminal, said second gate output terminal, and said switch operative for coupling said second clock output terminal in series with said first gate reset input terminal in order to enable said first gate to continue to pass first clock output impulses to said storing unit means read input terminal subsequent to the operation of said sensing means.

19. In a data storing system, a storing unit including means having a read input terminal and an output terminal capable of storing at least one data signal therein, said storing unit means being operative in response to the storage of a data signal therein and to the subsequent application of an impulse to said read input terminal for producing a signal on said output terminal, clock pulse means having first and second output terminals operative for alternately producing impulses on said first and said second clock output terminals, a logic circuit having first, second and third bistable ferrite cores, each of said cores having signal and reset input windings and an output winding, each of said cores being operative in response to the application of impulses to said signal and said reset windings for driving said core between first and second conditions, respectively, each of said cores being effective in response to a change from first to second condition for producing an impulse on said output winding, means including said input and said output windings of said first core connected in series with said signal input and said output windings of said third core for coupling said first clock output terminal to said reset winding of said second core and to said storing means read input terminal in order to normally transmit impulses from said first clock output terminal to said storing unit means read input terminal and to reset said second core to its first condition, a switch having a control input terminal and a signal input terminal and output terminal operative in response to the application of a signal to said control input terminal for passing impulses between its said signal input terminal and said output terminal thereof, means including said signal winding and said output winding of said second core connected in series with said signal input terminal and output terminal of said switch for coupling said second clock output terminal to said first core reset input winding in order to allow impulses from said second clock output terminal normally to reset said first core, means for connecting said second clock output terminal to said third core reset input winding and to said switch control input terminal in order to allow impulses from said second clock output terminal to reset said third core and to enable said switch to pass signals from said second clock output terminal to said first core reset input winding.

20. The data storing system set forth in claim 19 wherein said second core has an additional, inhibit winding and said second core is responsive to a signal applied to said inhibit winding for changing said second core from second to first condition, and having in addition sensing means operative for applying a signal to said second core inhibit winding at a time non-coincident with signals occurring on said second clock output terminal, whereby the flow of impulses from said first clock output terminal to said storing unit means read input terminal may be stopped upon the operation of said sensing means.

21. The data storing system set forth in claim 20 and having in adddition means connected in series with said first core reset winding, said second core output winding, and said switch operative for completing an alternate path coupling said second clock output terminal in series with said first core reset winding in order to enable said first gate to continue to pass first clock output impulses to said storing unit means read input terminal subsequent to the operation of said sensing means.

22. In a data storing system having a shift register comprising a plurality of stages for receiving each of a series of signals from a source and applying such signals to a load, each of said stages having an input terminal and an output terminal, said stages being arranged in a series with said source connected to said input terminal of the first of said stages, said output terminal of each of the first and intermediate said stages being connected to said input terminal of the next succeeding one of said stages, and said output terminal of the last of said stages being connected to said load; the combination comprising: clock pulse means having first and second output terminals operative for producing impulses alternately on said first and said second output terminals, in combination with the following elements in each of said stages; first and second storing units, each of said storing units including a means having signal and read input terminals and an output terminal operative in response to the application of a signal to said signal input terminal and to the subsequent application of an impulse to said read input terminal for producing a signal on said output terminal thereof, means for coupling said stage input terminal to said first storing unit means signal input terminal, first and second switching means, each of said first and said second switching means having a control input terminal and being operative in response to the application of a signal to said control input terminal for passing signals from said first storing unit means output terminal to said second storing unit means signal input terminal and for passing signals from said second storing unit means output terminal to said stage output terminal, respectively, first and second connecting means for connecting said first clock output terminal to said control input terminal of said first switching means and for connecting said second clock output terminal to said control input terminal of said second switching means and to said read input terminal of said second storing unit means, respectively, a logic circuit having a gate, means including said gate normally operative for coupling said first clock output terminal to said first storing unit means read input terminal, whereby a signal applied to said input terminal of the first of said stages from said source is passed through that and each succeeding storing stage toward said load upon the occurrence of successive impulses on each of said first and said second clock output terminals.

23. In a data storing system having a shift register comprising a plurality of stages for receiving each of a series of signals from a source and applying such signals to a load, each of said stages having an input terminal and an output terminal, said stages being arranged in a series with said source connected to said input terminal of the first of said stages, said output terminal of the first and intermediate stages being connected to said input terminal of the next succeeding one of said stages, and said output terminal of the last of said stages being connected to said load; the combination comprising: clock pulse means having first and second output terminals operative for producing impulses alternately on said first and said second output terminals, in combination with the following elements in each of said stages; first and second storing units, each of said storing units including a bistable ferrite core having signal and read input windings, and an output winding operative in response to the application of a signal to said signal winding and to said read winding for driving said core between first to second stable conditions, respectively, each of said cores being effective in response to a change from second to first condition for producing a signal on said output winding, means for coupling said stage input terminal to said first storing unit core signal input winding, first and second switching means, each of said first and said second switching means having a control input terminal and being operative in response to the application of a signal thereto for passing signals from said first storing unit core output winding to said second storing unit core signal input winding and for passing signals from said second storing unit core output winding to said stage output terminal, respectively, first and second connecting means for connecting said first clock output terminal to said control input terminal of said first switching means and for connecting said second clock output terminal to said control input terminal of said second switching means and to said read input winding of said second storing unit core, respectively, a logic circuit having a gate, means including said gate normally operative for coupling said first clock output terminal to said first storing unit core read input winding, whereby a signal applied to said input terminal of the first of said stages from said source is passed through that and each succeeding stage of said register toward said load upon the occurrence of pairs of successive impulses on said first and said second clock output terminals.

24. In a data storing system having a shift register comprising a plurality of stages for receiving each of a series of signals from a source and applying such signals to a load, each of said stages having an input terminal and an output terminal, said stages being arranged in a series with said source connected to said input terminal of the first of said stages, said output terminal of each of the first and intermediate said stages being connected to said input terminal of the next succeeding one of said stages in the series, and said output terminal of the last of said stages being connected to said load; the combination comprising: clock pulse means having first and second output terminals operative for alternately producing impulses on said first and said second output terminals, and the following elements in each of said stages; first and second storing units, each of said storing units including bistable means having signal and read input terminals and an output terminal operative in response to the application of a signal to said signal input terminal and to the subsequent application of an impulse to said read input terminal for producing a signal on said output terminal thereof, means for coupling said stage input terminal to said signal input terminal of said first storing unit means, first and second switching means, each of said first and said second switching means having a control input terminal and being operative in response to the application of an impulse to said control input terminal for passing signals from said first storing unit means output terminal to said second storing unit means signal input terminal and for passing signals from said second storing unit means output terminal to said stage output terminal, respectively, first and second connecting means for connecting said first clock output terminal to said control input terminal of said first switching means and for connecting said second clock output terminal to said control input terminal of said second switching means and to said read input terminal of said second storing unit means, respectively, a logic circuit including first and second bistable gates, each of said gates having a reset input terminal and being operative in response to the application of an impulse to said reset input terminal for subsequently passing impulses therethrough, means including said first gate for coupling said first clock output terminal to said first storing unit means read input terminal and to said second gate reset input terminal, means including said second gate normallly operative for coupling said second clock output terminal to said first gate reset input terminal, whereby a signal read into any one of said stages in synchronism with a first occurring signal on said second clock output terminal normally is stored within said first storing unit means, subsequently read out to said second storing unit means upon the occurrence of the next impulse on said first clock output terminal, and retransmitted from said second storing unit to the next succeeding one of said stages upon the occurrence of the next succeeding impulse on said second clock output terminal.

25. The data storing system set forth in claim 24 and having in addition sensing means individual to each of said stages operative in response to the appearance of a signal on said output terminal of said first storing unit means for producing a signal, inhibiting means in said logic circuit within each of said stages, means for coupling said inhibiting means in each of said intermediate and said last stages to said sensing means of the next preceeding one of said stages, said inhibiting means being operative in response to the application of a signal thereto for blocking the passage of signals through said means including said second gate within said logic circuit of the same one of said stages, whereby the passage of a signal from said first to said second storing unit of the first or any intermediate one of said stages may interrupt the flow of read signals from said first clock output terminal to said first storing unit means read input terminal within the next succeeding one of said stages and thereby causes a signal received within said first storing means of the succeeding stage to be held therein.

26. The data storing system set forth in claim 25 and having in addition means including said second gate in each of the intermediate and last of said stages for coupling said second clock output terminal to said reset input terminal of said first gate within the next preceding one of said stages, whereby a signal passed to an intermediate one of said stages upon the occurrence of a particular impulse on said second clock output terminal is held within that stage unless the next succeeding one of said stages is prepared to receive a signal within its said first storing unit upon the occurrence of the next succeeding impulse on said first clock output terminal.

27. The data storing system set forth in claim 26 wherein said load includes means operative in response to the application of signals from said output terminal of the last of said stages for utilizing signals applied to said shift register by said source, and means operative in response to the operation of said signal utilizing means for applying a signal to said reset input terminal of said first gate within said logic circuit of the last of said stages, whereby signals are read out from said shift register only upon the complete utilization of any signal within said load utilizing means.

28. The data storing system set forth in claim 26 wherein said load includes means operative in response to the application of signals from said output terminal of the last of said stages for utilizing signals reconstructed from signals applied to said shift register by said source, and means for applying a signal to said reset input terminal of said first gate within said logic circuit of at least the last of said stages.

29. The data storing system set forth in claim 26 wherein said load includes means operative in response to the application of signals from said output terminal of the last of said stages for utilizing signals reconstructed from signals applied to said shift register by said source, and means for applying a signal to said reset input terminal of said first gate within said logic circuit of the last of said stages.

30. The data storing system set forth in claim 26 wherein said load includes means operative in response to the application of signals from said output terminal of the last of said stages for utilizing signals reconstructed from signals applied to said shift register by said source, and means for applying a signal to said reset input terminal of said first gate within said logic circuit of all of said stages.

31. The data storing system set forth in claim 26 wherein said source includes the following combination: means having an input gate operative in response to the application of a signal thereto for applying signals from said source to said input terminal of the first of said register stages, and sensing means operative in response to the production of a signal by said source for application to the first of said register stages for producing an inhibiting signal; and having in addition means for coupling said source to said inhibiting means of said logic circuit within the first of said stages, and means including said second gate of said logic circuit within the first of said stages for coupling said second clock output terminal to said input gate of said source, whereby signals are passed from said source to said input terminal of the first of said register stages only upon the coincidence of an impulse on said second clock output terminal with the passage of an impulse from second clock output terminal through said second gate of said logic circuit within the first of said stages.

32. In a data storing system having a shift register comprising a plurality of stages for receiving each of a series of signals from a source and applying such signals to a load, each of said stages having an input terminal and an output terminal, said stages being arranged in a series with said source connected to said input terminal of the first of said stages, said output terminal of each of the first and intermediate said stages being connected to said input terminal of the next succeeding one of said stages in the series, and said output terminal of the last of said stages being connected to said load; the combination comprising: clock pulse means having first and second output terminals operative for alternately producing inpulses on said first and said second output terminals, first and second storing units in each of said stages, each of said storing units including at least one bistable ferrite core having signal and read input windings and an output winding, each of said cores being operative in response to the application of a signal to said signal winding and to said read winding for driving said core between first and second stable conditions, respectively, each of said cores being effective in response to a change from second to first condition for producing a signal on said output winding, means in each of said stages for coupling said stage input terminal to said first storing unit core signal input winding, first and second switching means in each of said stages, each of said first and said second switching means having a control input terminal and being operative in response to the application of a signal thereto for passing signals from said first storing unit core output winding to said second storing unit core signal input winding and for passing signals from said second storing unit core output winding to said stage output terminal, respectively, first and second connecting means for connecting said first clock output terminal to said control input terminal of said first switching means and for connecting said second clock output terminal to said control input terminal of said second switching means and to said read input winding of said second storing core unit, respectively, a logic circuit within each of said stages, each of said logic circuits including first and second bistable gates, each of said gates having a reset input terminal and being operative in response to the application of an impulse to said reset input terminal for subsequently passing impulses therethrough, means including said first gate for coupling said first clock output terminal to said first storing unit core read input winding and to said second gate reset input terminal, means including said second gate normally operative for coupling said second clock output terminal to said first gate reset input terminal, whereby a signal read into any one of said stages in synchronism with a first signal occurring on said second clock output terminal normally is stored within said first storing unit core, subsequently read out to said second storing unit core upon the occurrence of the next impulse on said first clock output terminal, and retransmitted from said second storing unit to the next succeeding one of said stages upon the occurrence of the next succeeding impulse on said second clock output terminal.

33. The data storing system set forth in claim 32 and having in addition sensing means individual to each of said stages operative in response to the shift from second to first condition of said core within said first storing unit means for producing a signal, inhibiting means in said logic circuit within each of said stages, means for coupling said inhibiting means in each of said intermediate and said last stages to said sensing means of the next preceding one of said stages, said inhibiting means being operative in response to the application of a signal thereto for blocking the passage of signals through said means including said second gate within said logic circuit of the same one of said stages, whereby the passage of a signal from said first to said second storing unit of the first or any intermediate one of said stages may interrupt the flow of read signals from said first clock output terminal to said first storing unit means read input terminal within the next succeeding one of said stages and thereby causes a signal received within said first storing means of the succeeding stage to be held therein.

34. The data storing system set forth in claim 33 and having in addition means including said second gate in each of the intermediate and last of said stages for coupling said second clock output terminal to said reset input terminal of said first gate within the next preceding one of said stages, whereby a signal passed to an intermediate one of said stages upon the occurrence of a particular impulse on said second clock output terminal is held within that stage unless the next succeeding one of said stages is prepared to receive a signal within its said first storing unit upon the occurrence of the next succeeding impulse on said first clock output terminal.

35. The data storing system set forth in claim 34 wherein said source includes the following combination: means having an input gate operative in response to the application of a signal thereto for applying signals from said source to said input terminal of the first of said register means, and sensing means operative in response to the production of a signal by said source for application to the first of said register stages for producing an inhibiting signal; and having in addition means for coupling said source to said inhibiting means of said logic circuit within the first of said stages, and means including said second gate of said logic circuit within the first of said stages for coupling said second clock output terminal to said input gate of said source, whereby signals are passed from said source to said input terminal of the first of said register stages only upon the coincidence of an impulse on said second clock output terminal with the passage of an impulse from second clock output terminal through said second gate of said logic circuit within the first of said stages.

36. The data storing system set forth in claim 34 wherein said load includes means operative in response to the application of a signal from said output terminal of the last of said stages for utilizing signals applied to said shift register by said source, and means operative in response to the operation of said signal utilizing means for applying a signal to said reset input terminal of said first gate within said logic circuit of the last of said stages, whereby signals are read out from said shift register only upon the complete utilization of any signal within said load utilizing means.

37. The data storing system set forth in claim 34 wherein said load includes means operative in response to the application of signals from said output terminal of the last of said stages for utilizing signals reconstructed from signals applied to said shift register by said source, and means for applying a signal to said reset input terminal of said first gate within said logic circuit of the last of said stages.

38. The data storing system set forth in claim 34 wherein said load includes means operative in response to the application of signals from said output terminal of the last of said stages for utilizing signals reconstructed from signals applied to said shift register by said source, and means for applying a signal to said reset input terminal of said first gate within said logic circuit of at least the last of said stages.

39. The data storing system set forth in claim 34 wherein said load includes means operative in response to the application of signals from said output terminal of the last of said stages for utilizing signals reconstructed from signals applied to said shift register by said source, and means for applying a signal to said reset input terminal of said first gate within said logic circuit of all of said stages.

No references cited.

UNITED STATES PATENT OFFICE

CERTIFICATION OF CORRECTION

Patent 2,995,734 August 8, 1961

Glenn L. Richards

It is hereby certified that error appears in the above numbered patent requiring correction and that the said Letters Patent should read as corrected below.

Column 8, line 28, after "as well as" insert -- a --; line 47, for "142, which" read -- 142. Switch 142, which --; column 11, line 51, for "21" read -- 221 --; column 13, line 32, for "a impulse" read -- A impulses --; column 23, line 67, for "operating" read -- operative --.

Signed and sealed this 3rd day of April 1962.

(SEAL)
Attest:

ERNEST W. SWIDER
Attesting Officer

DAVID L. LADD
Commissioner of Patents